(12) United States Patent
Ackerman et al.

(10) Patent No.: US 9,991,825 B1
(45) Date of Patent: Jun. 5, 2018

(54) OUTDOOR POWER EQUIPMENT SYSTEM WITH MODULAR MOTOR AND MODULAR BATTERY

(71) Applicant: THE TORO COMPANY, Bloomington, MN (US)

(72) Inventors: LaVern L. Ackerman, Eagan, MN (US); Gregory S. Janey, Shakopee, MN (US); Karl D. Heal, St. Paul, MN (US); Allan D. Kanitz, Lakeville, MN (US)

(73) Assignee: THE TORO COMPANY, Bloomington, MN (US)

( * ) Notice: Subject to any disclaimer, the term of this patent is extended or adjusted under 35 U.S.C. 154(b) by 0 days. days.

(21) Appl. No.: 14/944,426

(22) Filed: Nov. 18, 2015

Related U.S. Application Data

(60) Provisional application No. 62/083,409, filed on Nov. 24, 2014.

(51) Int. Cl.
*H02P 4/00* (2006.01)
*H02K 7/14* (2006.01)
*H02P 7/06* (2006.01)

(52) U.S. Cl.
CPC .............. *H02P 4/00* (2013.01); *H02K 7/145* (2013.01); *H02P 7/06* (2013.01)

(58) Field of Classification Search
CPC .................................................... H02K 7/145
See application file for complete search history.

(56) References Cited

U.S. PATENT DOCUMENTS 2,695,071 A 11/1954 Hupp
2,864,293 A 12/1958 Edrich et al.
(Continued)

FOREIGN PATENT DOCUMENTS

AU 33089/78 A1 8/1979
CN 201199797 Y 3/2009
(Continued)

OTHER PUBLICATIONS

"New Bosch Cordless Lawn Mower is Powered by One or Two 36V Battery Packs" Review [online]. [Retrieved on Nov. 4, 2016]. Retrieved from the Internet: <URL: http://toolguyd.com/bosch-cordless-lawn-mower/>. Apr. 9, 2015; 10 pages.
(Continued)

*Primary Examiner* — Shawki S Ismail
*Assistant Examiner* — Muhammad S Islam
(74) *Attorney, Agent, or Firm* — Mueting, Raasch & Gebhardt, P.A.

(57) ABSTRACT

A power equipment system with a plurality of power equipment units each including a working tool. Each of the power equipment units may include provisions permitting independent connection with both a battery and an electric motor, wherein the battery and electric motor may be moved between different power equipment units as needed. In some embodiments, a first power equipment unit may provide an identity information signal of the associated working tool to a controller of either or both of the motor and the battery. The identity information may limit or control one or more operating parameters of the motor when the motor is installed on the first power equipment unit.

12 Claims, 20 Drawing Sheets

(56) References Cited

U.S. PATENT DOCUMENTS

| | | | |
|---|---|---|---|
| 2,908,153 A | 10/1959 | Kolls et al. | |
| 3,012,441 A | 12/1961 | Lamb et al. | |
| 3,040,590 A | 6/1962 | Smithburn | |
| 3,603,162 A | 9/1971 | Gohler | |
| 3,616,867 A | 11/1971 | Celli | |
| 4,625,134 A | 11/1986 | Weaver | |
| 4,733,471 A | 3/1988 | Rahe | |
| 4,757,786 A | 7/1988 | Ellegard | |
| 5,126,607 A | 6/1992 | Merriman, Jr. | |
| 5,251,428 A | 10/1993 | Gay | |
| 5,388,176 A | 2/1995 | Dykstra et al. | |
| 5,402,626 A | 4/1995 | Zinck | |
| 5,412,932 A | 5/1995 | Schueler | |
| 5,442,901 A | 8/1995 | Niemela et al. | |
| 5,449,140 A | 9/1995 | Lastowski | |
| 5,619,845 A | 4/1997 | Bruener et al. | |
| 5,722,111 A | 3/1998 | Sowell et al. | |
| 5,768,749 A | 6/1998 | Ohi et al. | |
| 5,775,074 A | 7/1998 | Walter | |
| 5,787,693 A | 8/1998 | Dyke | |
| 5,802,724 A | 9/1998 | Rickard et al. | |
| 5,809,653 A | 9/1998 | Everts et al. | |
| 5,826,414 A | 10/1998 | Lenczuk | |
| 5,855,069 A | 1/1999 | Matsubayashi et al. | |
| 5,896,931 A | 4/1999 | Roberts et al. | |
| 5,906,088 A | 5/1999 | Inui et al. | |
| 5,937,622 A | 8/1999 | Carrier et al. | |
| 5,937,623 A | 8/1999 | Wolf | |
| 5,941,057 A | 8/1999 | Chesack et al. | |
| 6,170,579 B1 | 1/2001 | Wadge | |
| 6,253,533 B1 | 7/2001 | Ehn, Jr. | |
| 6,263,980 B1 | 7/2001 | Wadge | |
| 6,474,747 B2 | 11/2002 | Beaulieu et al. | |
| 6,606,845 B1 | 8/2003 | Spies | |
| 6,643,959 B2 | 11/2003 | Jolliff et al. | |
| 6,662,878 B2 | 12/2003 | Kreissle et al. | |
| 6,675,562 B2 | 1/2004 | Lawrence | |
| 6,750,622 B2 | 6/2004 | Simizu et al. | |
| 6,922,981 B1 | 8/2005 | Tyree | |
| 7,392,869 B2 | 7/2008 | Carlson et al. | |
| 7,413,045 B2 | 8/2008 | Tien | |
| 7,482,768 B2 | 1/2009 | Lucas et al. | |
| 7,493,697 B2 | 2/2009 | Yoshida | |
| 7,594,377 B1 | 9/2009 | Jansen et al. | |
| 7,621,194 B1 | 11/2009 | Tyree | |
| 7,677,017 B2 | 3/2010 | Holby | |
| 7,743,683 B2 | 6/2010 | Dayton et al. | |
| 7,762,739 B2 | 7/2010 | Blanchard | |
| 7,884,560 B2 | 2/2011 | Lucas et al. | |
| 7,950,211 B1 | 5/2011 | Ta | |
| 8,024,995 B2 | 9/2011 | Dayton et al. | |
| 8,547,066 B2 | 10/2013 | Bieler et al. | |
| 8,653,786 B2 | 2/2014 | Baetica et al. | |
| 8,695,223 B2 | 4/2014 | Ito | |
| 8,910,459 B2 | 12/2014 | Abe et al. | |
| D726,227 S | 4/2015 | Aglassinger | |
| 9,125,341 B2 | 9/2015 | Ebihara et al. | |
| 9,210,839 B2 | 12/2015 | Schygge et al. | |
| 9,226,444 B2 | 1/2016 | Schygge et al. | |
| 2002/0175648 A1* | 11/2002 | Erko | A47L 11/14 318/560 |
| 2003/0079455 A1* | 5/2003 | Suchdev | A01B 1/065 56/16.9 |
| 2003/0163924 A1* | 9/2003 | Hempe | B23D 45/16 30/388 |
| 2003/0221399 A1* | 12/2003 | Hall | A01B 33/028 56/2 |
| 2008/0038073 A1 | 2/2008 | Paolicelli | |
| 2008/0098703 A1* | 5/2008 | Lucas | A01D 69/025 56/11.9 |
| 2008/0173138 A1* | 7/2008 | Dayton | A01C 5/02 81/53.1 |
| 2011/0131816 A1 | 6/2011 | Ito | |
| 2011/0131817 A1 | 6/2011 | Ito | |
| 2011/0198103 A1* | 8/2011 | Suzuki | B25F 5/00 173/46 |
| 2012/0228041 A1 | 9/2012 | Borinato | |
| 2013/0014966 A1 | 1/2013 | Tozawa et al. | |
| 2014/0144117 A1 | 5/2014 | Schygge et al. | |
| 2014/0150390 A1* | 6/2014 | Schygge | A01D 69/02 56/10.2 A |
| 2014/0165523 A1 | 6/2014 | Schygge et al. | |
| 2014/0165524 A1 | 6/2014 | Schygge et al. | |
| 2015/0007543 A1 | 1/2015 | Goman et al. | |
| 2015/0306756 A1 | 10/2015 | Lau et al. | |
| 2015/0343583 A1 | 12/2015 | McRoberts et al. | |

FOREIGN PATENT DOCUMENTS

| | | |
|---|---|---|
| CN | 101743799 A | 6/2010 |
| CN | 203851502 U | 10/2014 |
| EP | 1 508 266 A2 | 2/2005 |
| EP | 0 802 717 B1 | 4/2005 |
| EP | 1 803 342 A1 | 7/2007 |
| EP | 2 033 506 A2 | 3/2009 |
| EP | 2 299 516 A1 | 3/2011 |
| EP | 2 556 739 A1 | 2/2013 |
| EP | 2 875 712 A1 | 5/2015 |
| GB | 2 201 842 A | 9/1988 |
| WO | WO 2008/015479 A2 | 2/2008 |
| WO | WO 2013/009325 A1 | 1/2013 |
| WO | WO 2014/119115 A1 | 8/2014 |

OTHER PUBLICATIONS

U.S. Appl. No. 62/083,409, filed Nov. 24, 2014, Ackerman et al.

Greenworks, "Operator's Manual for Model 2100202: 40V Brushless String Trimmer," Feb. 10, 2014; 22 pages.

IDS Submission, "Troy-Bilt edapt string Trimmer." Believed available no later than Jan. 28, 2013. 1 page.

"Troy-Bilt Unveils an Outdoor Tool for all Seasons" review [online]. CNET. [retrieved on Sep. 7, 2016]. Retrieved from the Internet: <URL: http://www.cnet.com/products/troy-bilt-flex/preview/>. Posted Oct. 14, 2014; 3 pages.

Troy-Bilt, "Operator's Manual for Model TB60AF: 20 Volt Lithium-Ion Battery-Powered Trimmer." Troy-Bilt LLC, Cleveland, OH, USA. 2012; 16 pages.

Worx, "Pacesetter Auto-Adjusts to your walking speed," Operator's Manual for Model WG789 lawn mower. [retrieved on Sep. 15, 2016]. Retrieved from the Internet: <URL: https://images.worx.com/EN-US/MANUALS/WG789.PDF>, Copyright 2010. 52 pages.

"Worx 19" Cordless Electric Mower WG789—Review" [online]. Professional Power Tool Guide. [retrieved on Sep. 15, 2016], including enlarged picture from website. Retrieved from the Internet: <URL: http://professional-power-tool-guide.com/2012/07/worx-19-cordless-electric-mower-wg789-review/>. Review posted by Dan Maxey on Jul. 18, 2012; 4 pages (including enlarged picture).

* cited by examiner

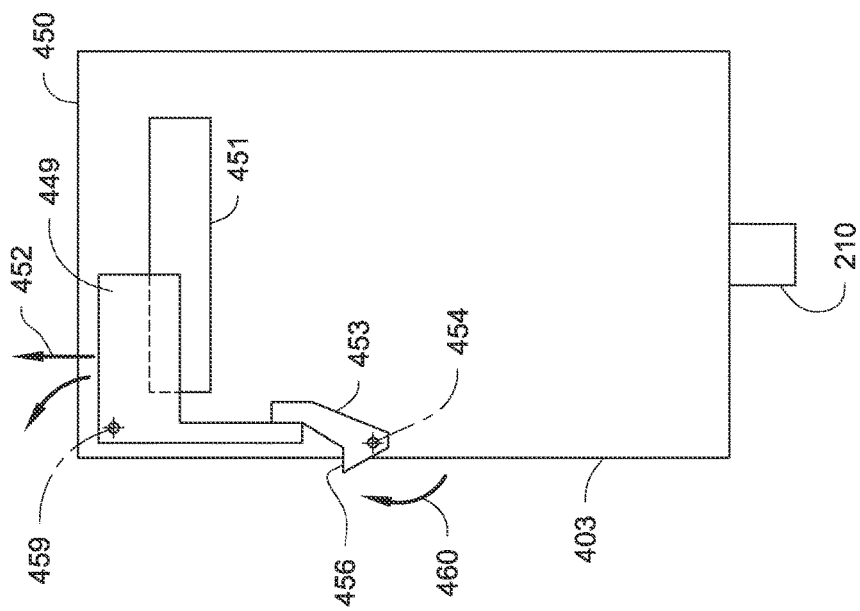
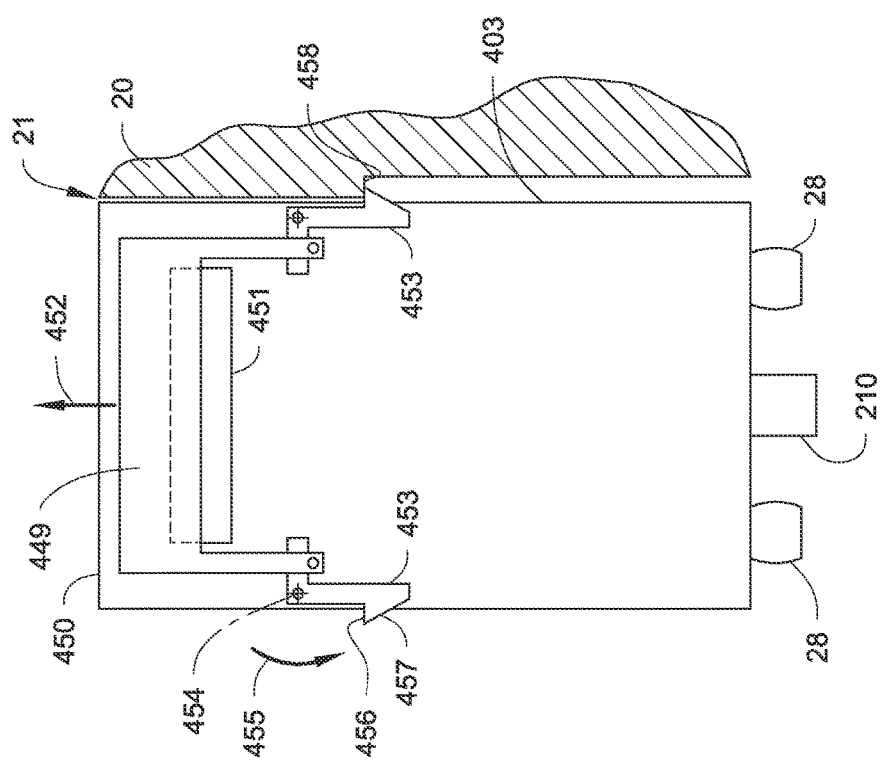

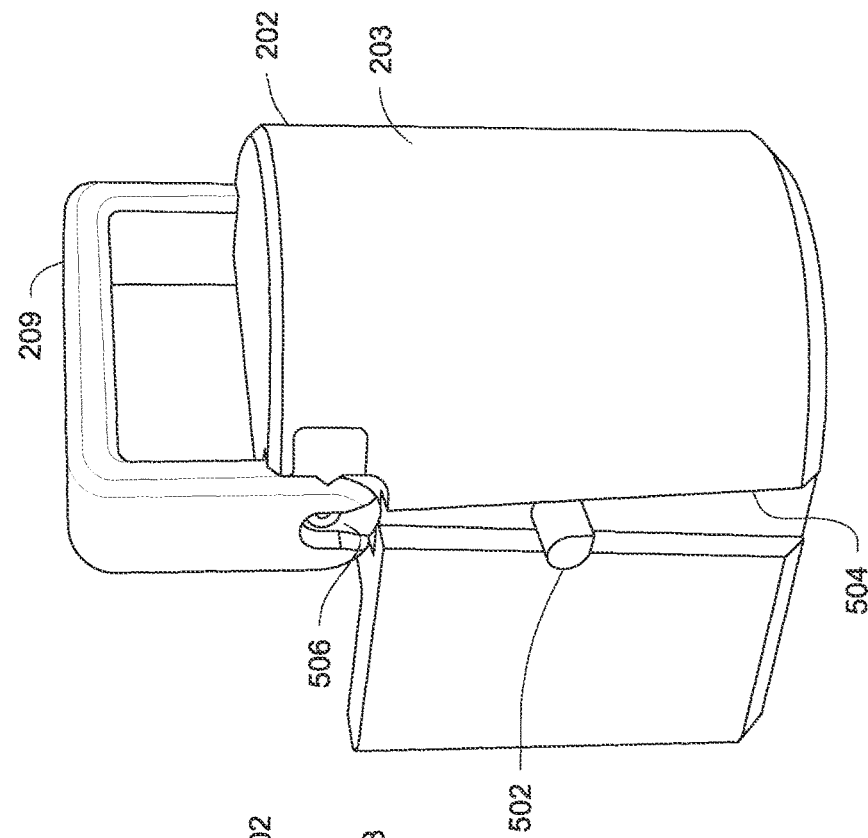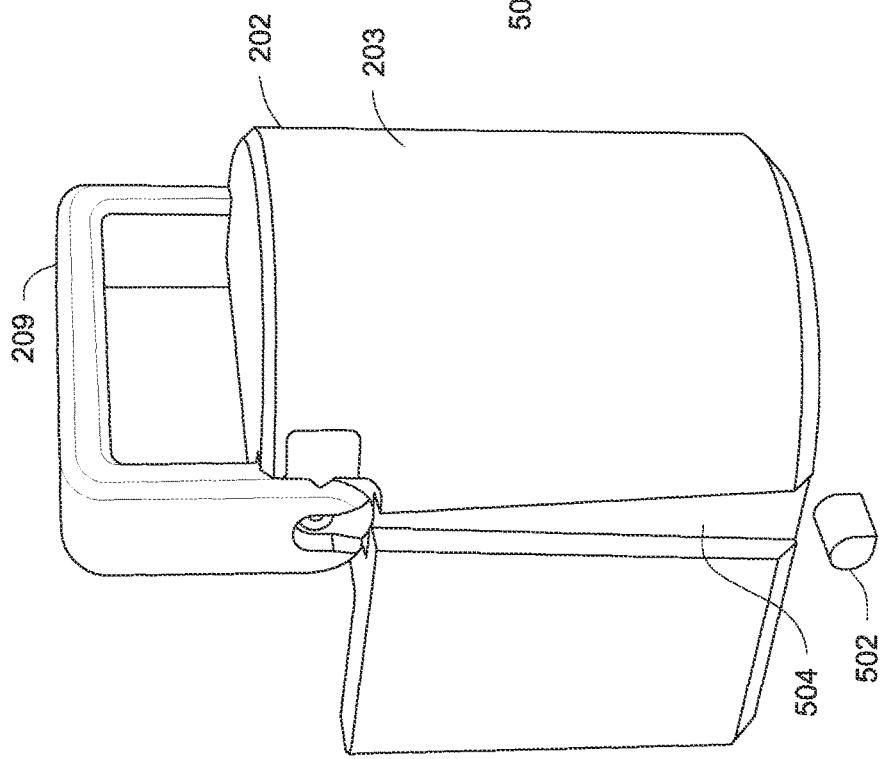

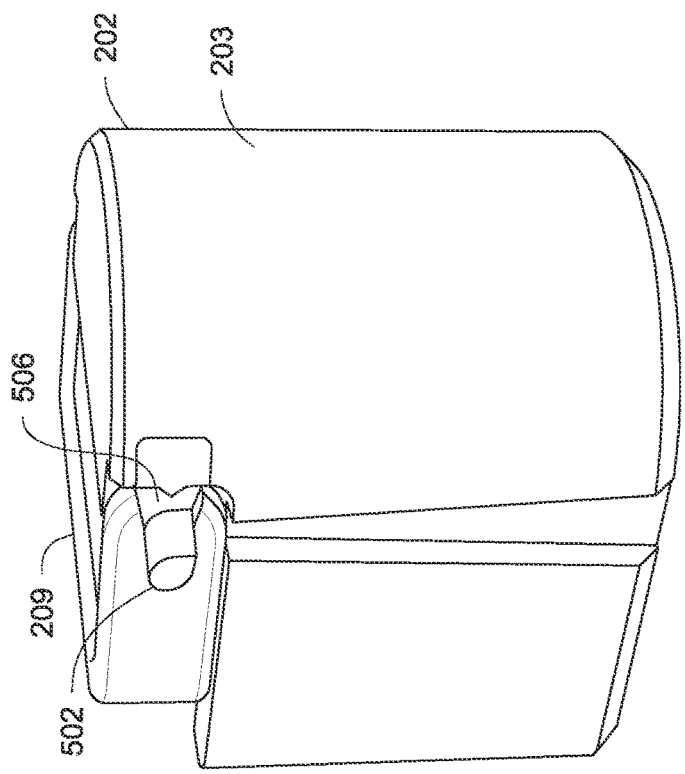
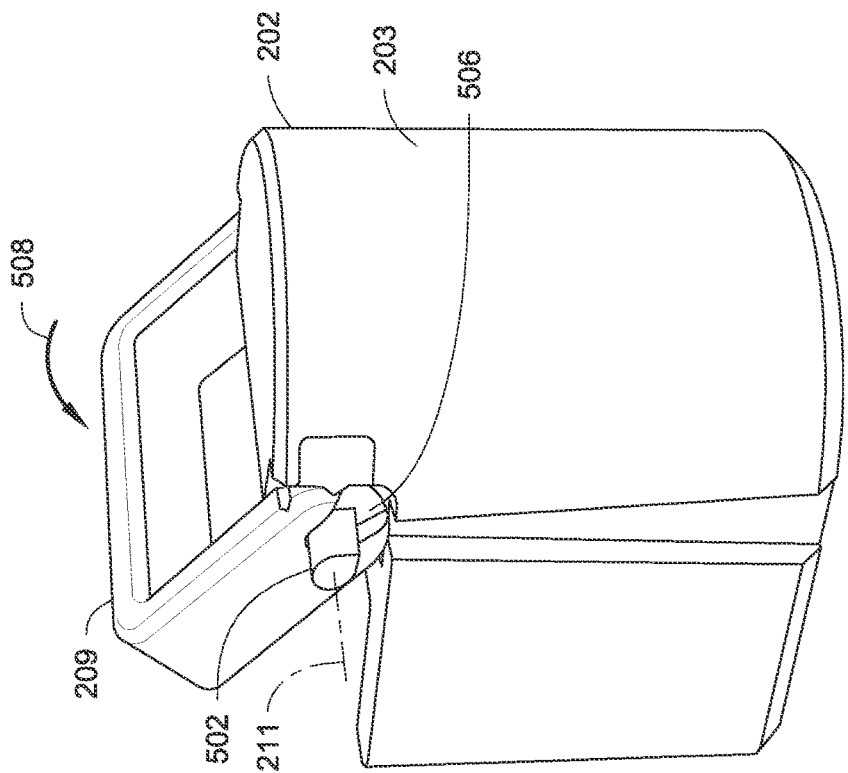

OUTDOOR POWER EQUIPMENT SYSTEM WITH MODULAR MOTOR AND MODULAR BATTERY

This application claims the benefit of U.S. Provisional Application No. 62/083,409, filed Nov. 24, 2014, which is incorporated herein by reference in its entirety.

Embodiments of the present disclosure relate generally to outdoor power equipment and, more particularly, to a system of electrical power equipment units wherein each unit may selectively receive both a modular motor and a modular power source (e.g., battery).

BACKGROUND

A homeowner typically owns several pieces of power equipment including, for example, a lawn mower, a snowthrower, and a leaf blower to name just a few. Each of these pieces of equipment generally includes a working tool (e.g., cutting blade on the lawn mower, auger/impeller on the snowthrower), as well as an integral power source such as a gasoline engine carried by the equipment and operable to power the working tool.

While effective, it is typical that only one such piece of power equipment is in use at any given time.

SUMMARY

One or more embodiments described herein may provide a power equipment system, wherein the system includes: a first power equipment unit having a first working tool and a first user interface; a second power equipment unit having a second working tool and a second user interface different than the first user interface; an electric motor comprising a motor housing; and a battery comprising a battery housing separate from the motor housing. The motor and the battery are configured to simultaneously connect, at independent locations, to either: the first power equipment unit; or the second power equipment unit, wherein the first working tool is operational when the motor and the battery are connected to the first power equipment unit, and the second working tool is operational when the motor and the battery are connected to the second power equipment unit.

In another embodiment, a power equipment system is provided that includes: an electric motor comprising a motor housing, an output member, and a motor controller; a battery comprising a battery housing and a battery controller, the battery housing separate from the motor housing, the battery adapted to provide power to the motor; and a first power equipment unit and a second power equipment unit each independently operable to simultaneously receive both the motor and the battery. The first and second power equipment units may each include: a battery interconnect adapted to electrically couple with the battery; a working tool; a coupler adapted to mechanically interconnect the output member of the motor with a driven member associated with the working tool; and a motor interconnect adapted to electrically couple with the motor. The first power equipment unit further includes a first tool controller adapted to provide an electrical identity information signal regarding the first power equipment unit to one or both of the motor controller and the battery controller when the motor and the battery are selectively coupled to the first power equipment unit.

In still another embodiment, a method of operating a plurality of power equipment units is provided that includes: attaching a battery having a battery housing at a first location on a first power equipment unit selected from at least two different power equipment units; and attaching an electric motor having a motor housing and a motor controller at a second location on the first power equipment unit. The method further includes: transmitting, from a tool controller of the first power equipment unit, an identity information signal corresponding to the first power equipment unit; receiving, with the motor controller, the identity information signal; and operating a first working tool associated with the first power equipment unit, the first working tool operating under power provided by the electric motor and battery.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein:

FIGS. 2A-2B illustrate a motor and a battery for an outdoor power equipment system in accordance with embodiments of the present disclosure, wherein: FIG. 2A illustrates the motor; and FIG. 2B illustrates the battery;

FIGS. 3A-3B illustrate a motor and a battery in accordance with yet another embodiment of the disclosure, wherein: FIG. 3A illustrates the motor; and FIG. 3B illustrates the battery;

FIGS. 4A-4B illustrate various exemplary embodiments of a power equipment unit forming a power head each having a tool coupler (no working tool illustrated), wherein: FIG. 4A is a perspective view of a first power head adapted to receive, for example, the motor and battery of FIGS. 2A and 2B, respectively; and FIG. 4B is a perspective view of a second power head adapted to receive the motor and battery of FIGS. 3A and 3B, respectively, wherein FIGS. 4A and 4B both illustrate the respective power heads prior to motor and battery attachment;

FIGS. 5A-5C illustrate exemplary embodiments of a (e.g., first or second) power equipment unit configured as a chain saw, wherein: FIG. 5A is a perspective view of one exemplary chainsaw adapted to receive the motor and battery of FIGS. 2A and 2B, respectively; FIG. 5B is a perspective view of an alternative embodiment of the chainsaw also adapted to receive the motor and battery of FIGS. 2A and 2B, respectively; and FIG. 5C is a perspective view of yet another embodiment of the chainsaw configured to receive the motor and battery of FIGS. 3A and 3B, respectively;

FIGS. 6A-6E illustrate exemplary embodiments of a (e.g., first or second) power equipment unit configured as a debris (leaf) blower, wherein: FIG. 6A illustrates a first blower embodiment; FIG. 6B illustrates an alternative embodiment having a different battery location; FIG. 6C illustrates another embodiment having yet another battery location; FIG. 6D illustrates still another embodiment of a debris blower providing still another battery location (wherein the embodiments of FIGS. 6A-6D utilize the motor and battery of FIGS. 2A and 2B, respectively); and FIG. 6E is a perspective view of a debris blower in accordance with still yet another embodiment of the disclosure, wherein the embodiment of FIG. 6E is adapted to receive the motor and battery of FIGS. 3A and 3B, respectively;

FIGS. 7A-7B illustrate exemplary embodiments of a (e.g., first or second) power equipment unit configured as a walk behind lawn mower, wherein: FIG. 7A is a perspective view of an embodiment adapted to receive the motor of FIG. 2A and two of the batteries of FIG. 2B; and FIG. 7B is an alternative mower embodiment adapted to receive the motor of FIG. 3A and two of the batteries of FIG. 3B;

FIGS. 8A-8C illustrate exemplary embodiments for cooling an electric motor attached to a power equipment unit, wherein: FIGS. 8A and 8B illustrate two different techniques for convective cooling; and FIG. 8C illustrates an exemplary technique for conductive cooling;

FIGS. 10A-10E diagrammatically illustrate an exemplary technique for attaching a motor to a body of a power equipment unit, wherein: FIG. 10A illustrates the motor before entry into a motor receptacle formed in the body; FIG. 10B illustrates in section the motor prior to mechanical coupling of an output shaft of the motor with a driven shaft of the power equipment unit; FIG. 10C illustrates in section the motor prior to electrical interconnection of the motor with the body; FIG. 10D illustrates in section the motor after electrical interconnection with the body; and FIG. 10E illustrates retention of the motor within the motor receptacle of the body;

FIGS. 11A-11B illustrate two alternative embodiments of a latch system for securing a motor within a motor receptacle of a housing of a power equipment unit, wherein: FIG. 11A illustrates a translating latch handle; and FIG. 11B illustrates a pivoting latch handle;

FIGS. 12A-12D illustrate a latch system for securing a motor within a motor receptacle of a housing of a power equipment unit in accordance with another embodiment of the disclosure, wherein: FIG. 12A illustrates the motor prior to insertion into the motor receptacle (receptacle not shown); FIG. 12B illustrates the motor partially inserted; FIG. 12C illustrates the motor fully inserted and after initial movement of a handle latch; and FIG. 12D illustrates the motor after the latch is fully engaged.

Figure 1:
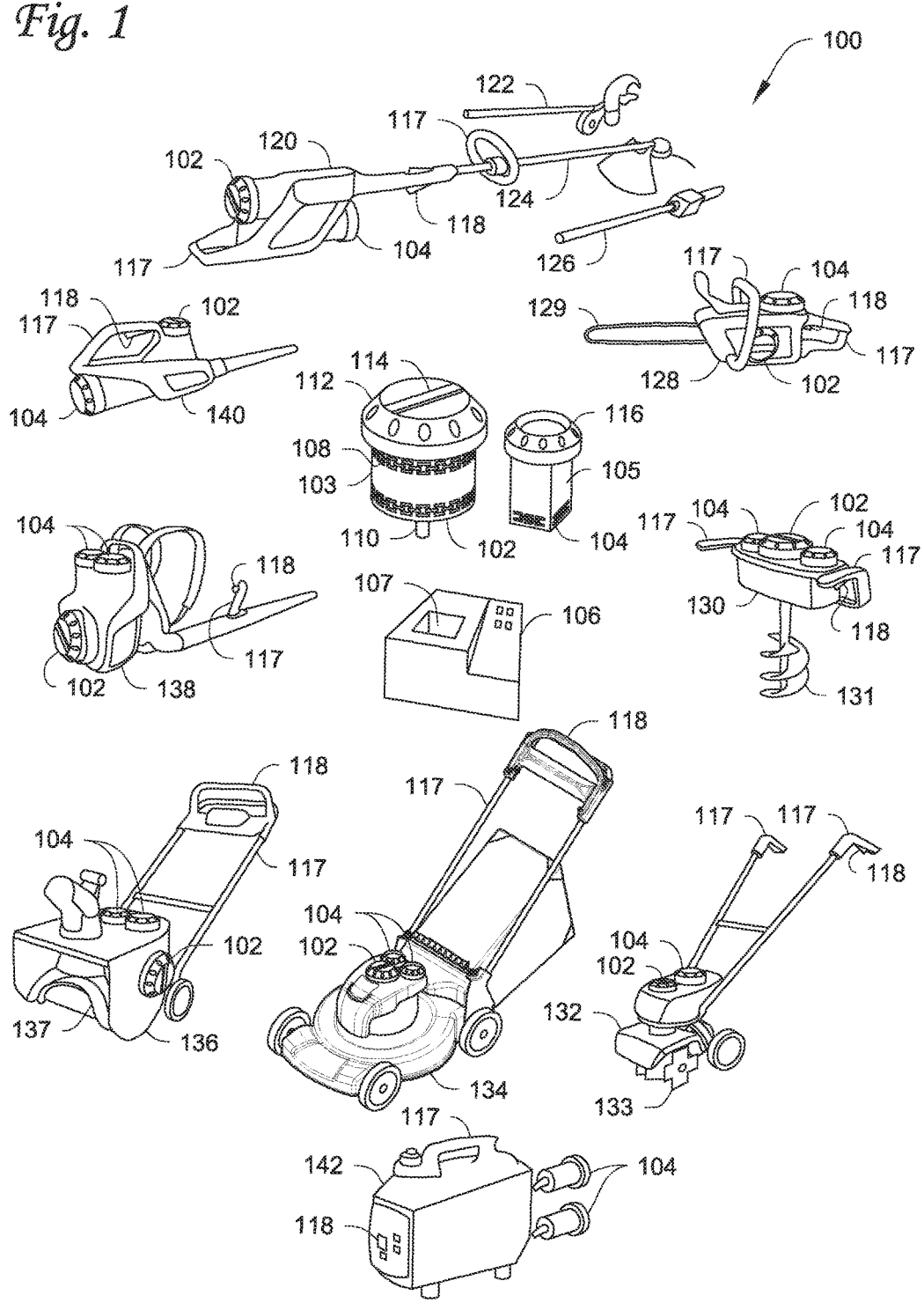
FIG. 1 is an exemplary embodiment of an outdoor power equipment system in accordance with embodiments of the present disclosure, the system having a modular motor, a modular battery, and various power equipment units configured to receive the motor and battery.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way. Still further, "Figure x" and "FIG. x" may be used interchangeably herein to refer to the figure numbered "x."

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may or may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, perpendicular, parallel, etc.) in the specification and claims are to be understood as being modified by the term "about."

Embodiments described and illustrated herein may be directed to a power equipment system having a modular motor and a separate modular battery, and a plurality of power equipment units that may each have a different working tool. Each of the power equipment units may include a body adapted to simultaneously receive, or otherwise connect with, both the motor and the battery, and the motor and battery may both be individually moved from one power equipment unit to another as needed. In some embodiments, the power equipment unit may be able to accommodate more than one battery to provide appropriately longer run times and/or higher power output to the motor.

In still other embodiments, the system may include a power inverter that receives one or more of the batteries (but not a motor) to then provide AC power (e.g., 120 Volt) to attached peripheral devices. A battery charger may also be provided with the system, the charger capable of charging at least one battery.

One or more of the power equipment units may, when the motor and battery are connected to the power equipment unit, communicate identity information (e.g., the unit may include a "tool controller" that defines an identity information signal or signals) regarding the power equipment unit and/or the working tool to the motor and/or the battery. The identity information may be used to control one or more performance characteristics or operating parameters of the motor and/or the battery by, for example, limiting a maximum or output speed or output power of the motor. These performance characteristics/operating parameters may be predetermined based upon the intended use of the particular power equipment unit. Moreover, as each power equipment unit may generate unique identity information, the same motor and battery may provide different performance characteristics/operating parameters for each power equipment unit.

In other embodiments, one or more power equipment units, the battery, or the motor may detect when the motor reaches an overload threshold and automatically reduce an output speed or output power of the motor (or, alternatively, may shut off the motor completely). Again, the overload threshold may be different for different power equipment units and may be part of the identity information generated or otherwise provided by each unit.

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of the particular, referenced figure. These terms are used only to simplify the description, however, and not to limit the interpretation of any embodiment described.

With reference to the figures of the drawing, wherein like reference numerals designate like parts and assemblies throughout the several views, FIG. 1 illustrates a power equipment system 100 in accordance with one or more embodiments of this disclosure. As shown in FIG. 1, the system may include at least one modular motor 102 and at least one modular battery 104. In some embodiments, the system 100 may include more than one battery 104 (and/or more than one motor) and one or more of the power equipment units may be adapted to simultaneously receive (or otherwise connect with) more than one battery (and/or more than one motor).

The system 100 may further include a battery charger 106 connectable to a source of AC power (e.g., a 120V wall outlet). The charger 106 may be used to recharge cells of the battery 104 after charge depletion. While shown as providing a single charging slot 107, alternative embodiments of the charger 106 may have two or more charging slots to accommodate parallel (simultaneous) or serial (sequential) charging of two or more batteries.

The motor 102 may, in one embodiment, include a motor housing 103 that isolates and protects various components of the motor. The motor housing 103 may include various openings (e.g., cooling vents 108) that pass through a housing wall. While the actual motor 102 may be most any electrically-powered motor (e.g., AC or DC, permanent magnet, etc.), it is, in one embodiment, configured as a brushless DC motor having a motor controller that controls, among other aspects, an output speed and output power of an output shaft 110 of the motor. For simplicity, the term "motor 102" (as well as the "motor 202" and the "motor 1202"), unless otherwise indicated, is understood as including the actual electric motor and its associated components (e.g., output shaft), all motor electronics (e.g., motor controller), and the surrounding motor housing.

In some embodiments, the motor housing 103 may incorporate a cap 112 forming a handle 114 conducive to permitting operator lifting and moving of the motor 102. In addition to the output shaft 110, the motor may include electrical contacts (not shown in FIG. 1) that permit electrical contact with corresponding interconnects on each of the power equipment units. As a result, the motor 102 may communicate with any one of the power equipment units, and with the battery 104, once the battery and the motor are both attached to the power equipment unit as further described below.

The battery 104, similar to the motor 102 may include, and be contained within, a battery housing 105 that is separate from the motor housing. The battery housing 105 may, in one embodiment, include a round or parallelepiped body that encloses one or more battery cells as well as a battery controller. In some embodiments, the battery 104 (e.g., battery cells) has a lithium-based chemistry such as lithium-ion. However, other chemistries are certainly possible. The battery housing 105 may also include a cap 116 having features that permit grasping of the battery 104 by hand. Although not shown in FIG. 1, each of the batteries 104 may include electrical contacts that permit electrical coupling with both: interconnects on each of the power equipment units; and interconnects on the battery charger 106. For simplicity, the term "battery 104" (as well as the "battery 204" and the "battery 1204"), unless otherwise indicated, is understood as including the battery cells, all battery electronics (e.g., battery controller), and the surrounding battery housing.

As used herein, the term "power equipment unit" (or "PEU") includes any one of a variety of devices that incorporates a working tool capable of performing an outdoor maintenance task. While specific PEUs are described herein, such description is exemplary only. That is, systems in accordance with embodiments of the present disclosure may include some (or all) of the PEU's identified, or may alternatively or additionally include one or more other PEUs, now known or later developed, that may not be described herein. Accordingly, FIG. 1 is intended to be only an example of one particular power equipment system 100.

As shown in FIG. 1, the system 100 may include a first power equipment unit having a first working tool, e.g., power head 120, capable of simultaneously receiving—at independent locations on the PEU—the battery 104 (e.g., battery housing 105) and the motor 102 (e.g., motor housing 103). The PEUs of the system 100 may connect, in some embodiments, with the motor 102 and the battery 104 by providing a PEU body having a motor receptacle that can receive and secure the motor therein, and one or more battery receptacles that may each receive one of the batteries therein. However, such a configuration is not limiting as other attachment techniques may also be used to connect the battery and motor to each PEU.

The power head 120 (as well as the other PEUs described herein) may also include a user interface (e.g., various handles 117, indicators, and controls 118) to allow operator support of, control of, and interaction with, the power head.

The power head 120 may be a dedicated tool or, as shown in FIG. 1, may have a tool coupler (e.g., shaft) that permits the power head to interchangeably receive one or more working tools to provide additional versatility. For example, the power head 120 may connect to any one of the following working tools: an edger 122; a string trimmer 124; and a pole saw 126. Stated another way, a single PEU may utilize more than one working tool.

FIG. 1 further illustrates second or alternative PEUs each having different working tools that may be included with the system 100. Each PEU may separately receive both the motor 102 and at least one battery 104, and each may incorporate a different working tool. Each may also include a user interface (e.g., handles 117 and controls 118) that is similar or, alternatively, different than the user interface provided by the power head 120. In the exemplary system 100 illustrated in FIG. 1, the PEUs include: a chain saw 128 (e.g., having a chain 129 as its working tool); a drill or auger 130 (e.g., having an auger bit 131 as its working tool); a cultivator/roto-tiller 132 (e.g., having tines 133 as its working tool); a walk-behind lawn mower 134 (e.g., having a cutting blade (not shown) as its working tool); a snowthrower 136 (e.g., having an impeller 137 as its working tool); a backpack debris blower 138 (e.g., having a fan (not shown) and directional airstream as its working tool); and a handheld debris blower 140 ((e.g., having a fan (not shown) and directional airstream as its working tool). Again, other PEUs that are not illustrated (e.g., a hedge trimmer, blower/vacuum, pressure washer, etc.) may also form part of the system 100.

As stated above, some of the PEUs shown may accommodate two batteries 104. For example, the auger 130, mower 134, snowthrower 136, and backpack leaf blower 138 are each shown with two batteries 104 installed in separate battery receptacles of the PEUs. Once again, multiple batteries may simultaneously be received by the PEU where space constraints permit, and where additional power is needed to support a typical, anticipated run time or tool load. Where multiple batteries are used, a power control system associated with the PEU and/or with the battery may control how the batteries are utilized (e.g., simultaneous (parallel) delivery of power to provide higher voltage, or sequential (series) delivery of power to provide longer run time).

While not illustrated specifically herein, one or more of the PEUs may accommodate more than one motor. For example, a mower could be provided that includes two or more separately driven mower blades each powered by its own motor, wherein each motor receives power from one or more batteries also attached to the mower.

In addition to the PEUs shown in FIG. 1, the system 100 may also include an inverter power pack 142 having a user interface, e.g., a handle 117 and controls 118. Unlike the PEUs, the power pack 142 receives only the batteries 104 and then delivers AC or DC power to accessories (e.g., radios, lights, AC chargers, etc.) plugged into the power pack.

Figure 2A:
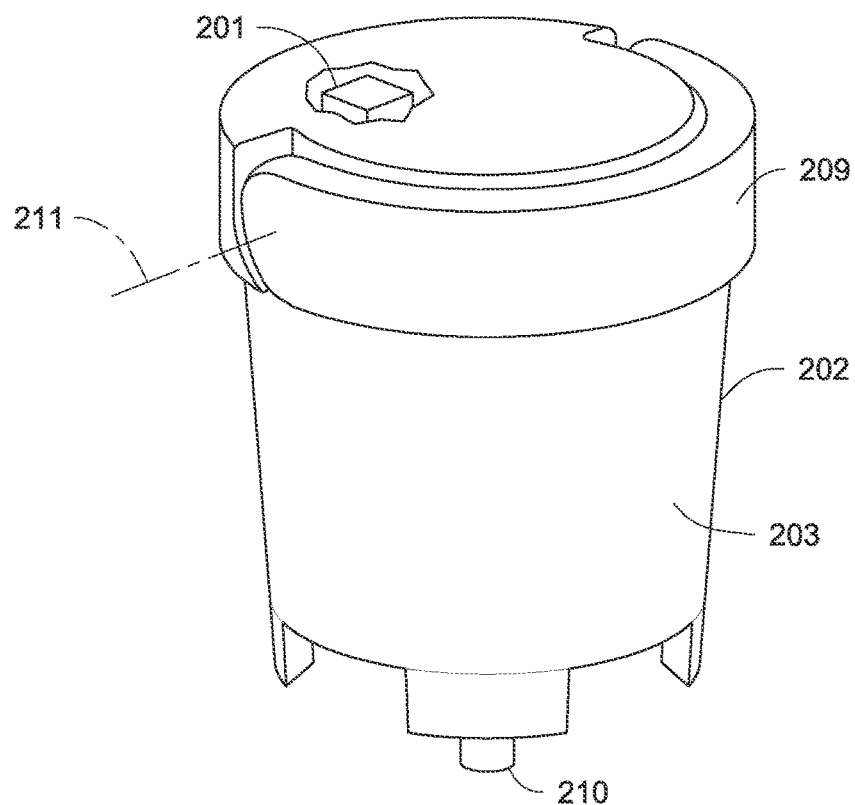
Figure 2B:
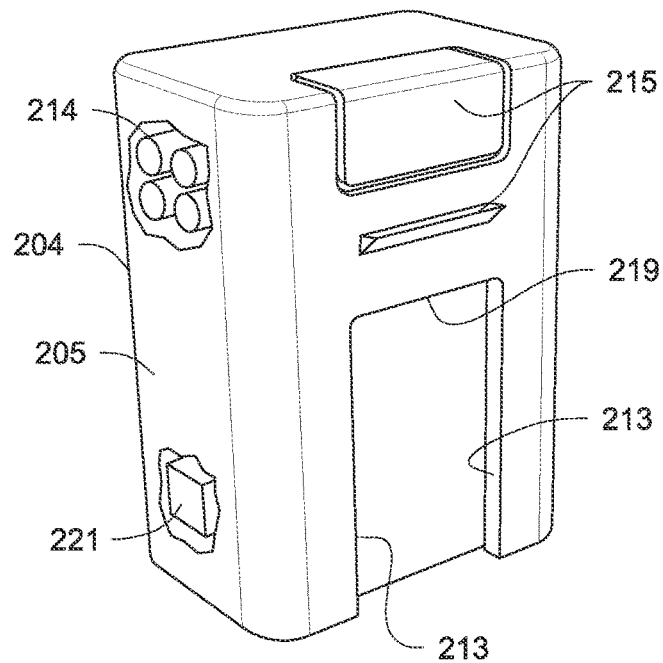

FIGS. 2A and 2B illustrates alternative embodiments of a motor 202 (including an electric motor, a motor housing 203, and a motor controller 201) and a battery 204 (including a battery housing 205, separate from the motor housing, a battery controller 221, and one or more rechargeable cells 214), respectively. The motor 202 and the battery 204 are (like the motor 102 and battery 104, respectively) configured to simultaneously connect to any one of the PEUs, wherein the working tool associated with the respective PEU becomes operational when the motor and the battery are so connected.

The motor 202 may eliminate the end cap of the motor 102 and instead provide a latch or latching device (embodiments of which are further described below) to secure the motor 202 (motor housing 203), e.g., to the body (e.g., within a motor receptacle) of the power equipment unit. The latching device may be formed by a pivoting handle 209 (e.g., pivoting about axis 211). The handle 209 may be used to not only grasp and move the motor 202 to and from the motor receptacle of the PEU, but also to latch or secure the motor to the power equipment unit (when the motor housing is fully received within the motor receptacle) as described below with reference to FIGS. 12A-12D. The motor 202 may be similar in other respects to the motor 102. For instance, it may include an output shaft 1210 connected to a DC brushless motor having an output power of 800-1500 Watts, e.g., 1000 Watts.

FIG. 2B further illustrates the exemplary battery 204. As shown in this view, the battery 204 may be generally parallelepiped in shape. In may further include slots 213 that engage tabs or ears formed on or near a battery receiver on the PEU to guide battery contacts 219 into abutment with electrical battery interconnects 23 (see, e.g., FIG. 4A) on the PEU. The battery 204 may further include a biased latch 215 that secures the battery to the PEU once the two components are fully mated.

Figure 3A:
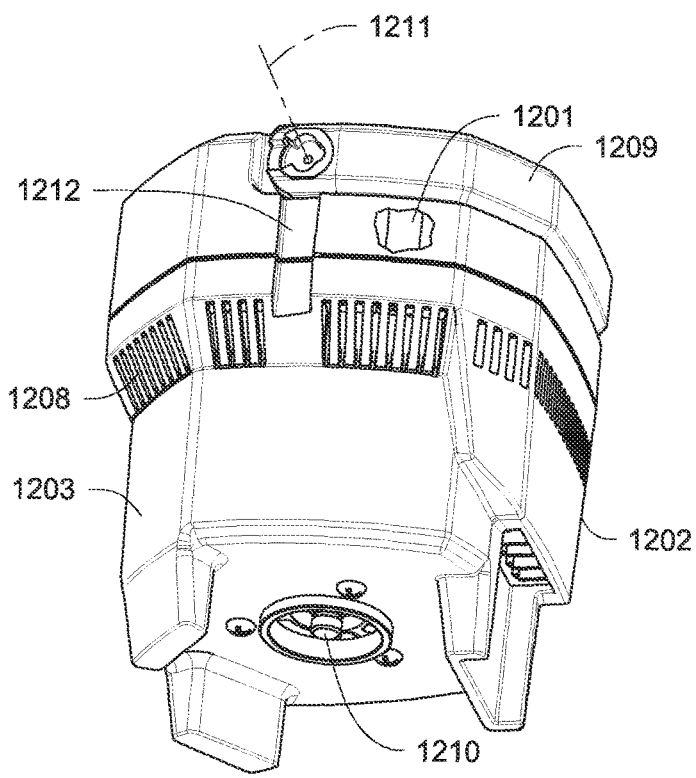
Figure 3B:
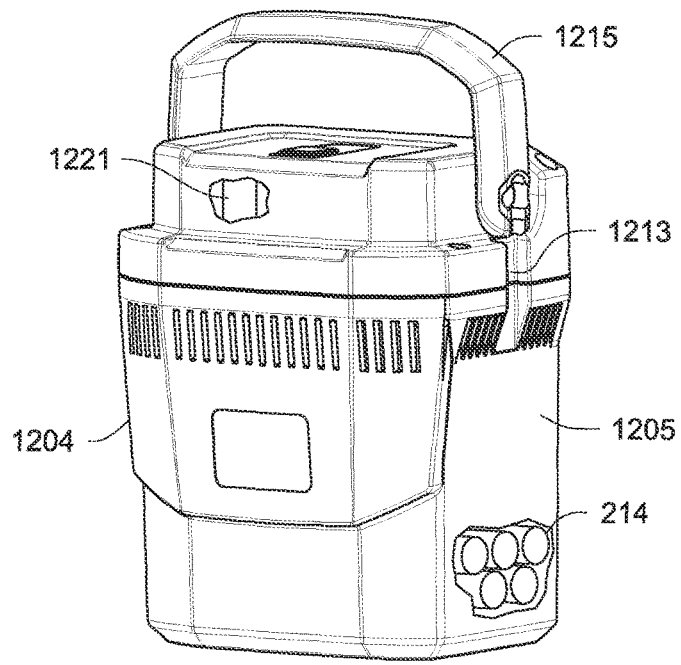

FIGS. 3A and 3B illustrates yet additional embodiments of a motor 1202 (including an electric motor, a motor housing 1203, and a motor controller 1201 (shown diagrammatically)) and a battery 1204 (including a battery housing 1205, separate from the motor housing, a battery controller 1221 (also shown diagrammatically), and cells 214), respectively. The motor 1202 (motor housing 1203) and the battery 1204 (battery housing 1205) are—like the motor 202 and battery 204, respectively—configured to simultaneously couple to any of the PEUs, wherein the working tools associated with the respective PEUs become operational when the motor and the battery are so connected. The motor 1202 may again be a DC brushless motor having an output of 800-1500 Watts, e.g., 1000 Watts.

The motor housing 1203 of the motor 1202 may also provide a latching device to secure the motor, e.g., to the body (e.g., within the motor receptacle) of the power equipment unit. As with the motor 202, the latching device may include a pivoting handle 1209 (e.g., pivoting about an axis 1211) that may be used to both physically lift the motor 1202 as well as to latch or secure the motor to the power equipment unit (when the motor housing is fully received within the motor receptacle) as further described below. In the illustrated embodiment, the latching device may function in conjunction with a slot 1212 formed in the housing 1203 (only one shown in FIG. 3A, but opposite side would include a similar slot). These slots 1212 may engage pins formed in or near the motor receptacle of the PEU to index and guide the motor into the receptacle in a manner that, again, is further described below. The handle 1209 may be pivoted (e.g., to the position shown in FIG. 3A), once the motor 1202 is inserted into the motor receptacle, to secure the motor to the PEU. The motor 1202 may be similar in other respects (e.g., have an output shaft 1210 and cooling vents 1208) to the motors 102 and 202 described herein.

FIG. 3B further illustrates the exemplary battery 1204. Unlike the battery housings 105 and 205, the battery housing 1205 of the battery 1204 is constructed in a manner similar to the motor housing 1203 in that it generally includes slots 1213 (only one side shown, but opposite side includes a similar slot) that work in conjunction with a pivoting handle 1215 to guide and secure the battery housing in place within a battery receptacle (not shown) of the PEU. Again, these slots 1213 may engage pins formed on or near the battery receptacle of the PEU to index and guide electrical contacts, e.g., a battery connector 1219 (see, e.g., FIG. 4B), on the bottom of the battery housing into contact with electrical interconnects on the PEU. Similar to the motor 1202, the latching handle 1215 of the battery 1204 may be used not only to transport the battery, but may ultimately be rotated to secure the battery housing to the PEU (e.g., within the battery receptacle) once the two components are fully mated.

Figure 4A:
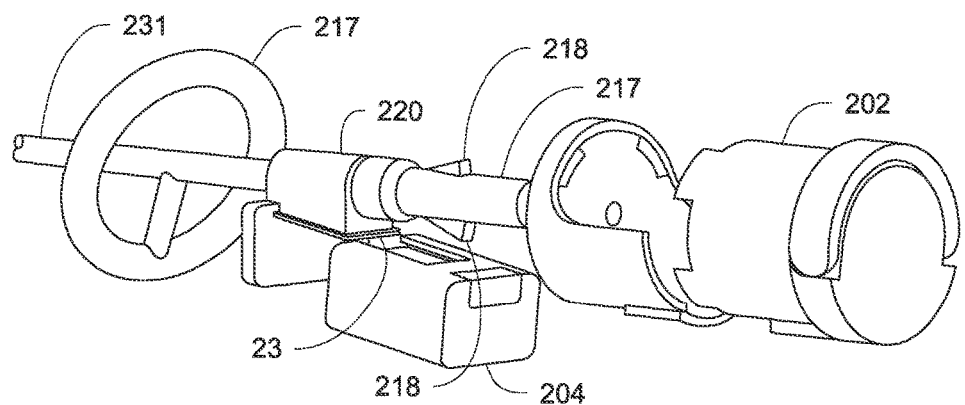

FIG. 4A illustrates an exemplary PEU, e.g., a power head 220, in accordance with one embodiment of the disclosure, wherein the power head utilizes the motor 202 and battery 204 of FIGS. 2A and 2B respectively (each shown just prior to attachment with the PEU). The power head may include a user interface (e.g., handles 217 and controls (e.g., switches) 218) to assist the operator with supporting and operating the PEU. As indicated above, a working tool (e.g., edger 122, trimmer 124, or pole saw 126 of FIG. 1) may attach to a protruding shaft or tool coupler 231 of the power head 220 as needed. As described herein, the user interface may include most any handles, controls, indicators, displays, etc., that may assist the user with the operation of the PEU 220, or that provide information regarding the PEU to the user. For example, the user interface may include a simple on/off switch, a more sophisticated variable output control (e.g., rheostat), a dual actuation switch, or a combination of the same. Moreover, the user interface may include any number of handles that permit the operator to manipulate the PEU. Still further, displays or other output devices (e.g., LCDs, meters, indicator lights, audible indicators, etc.) that provide useful information regarding the PEU to the operator are also contemplated within the definition of "user interface."

Figure 4B:
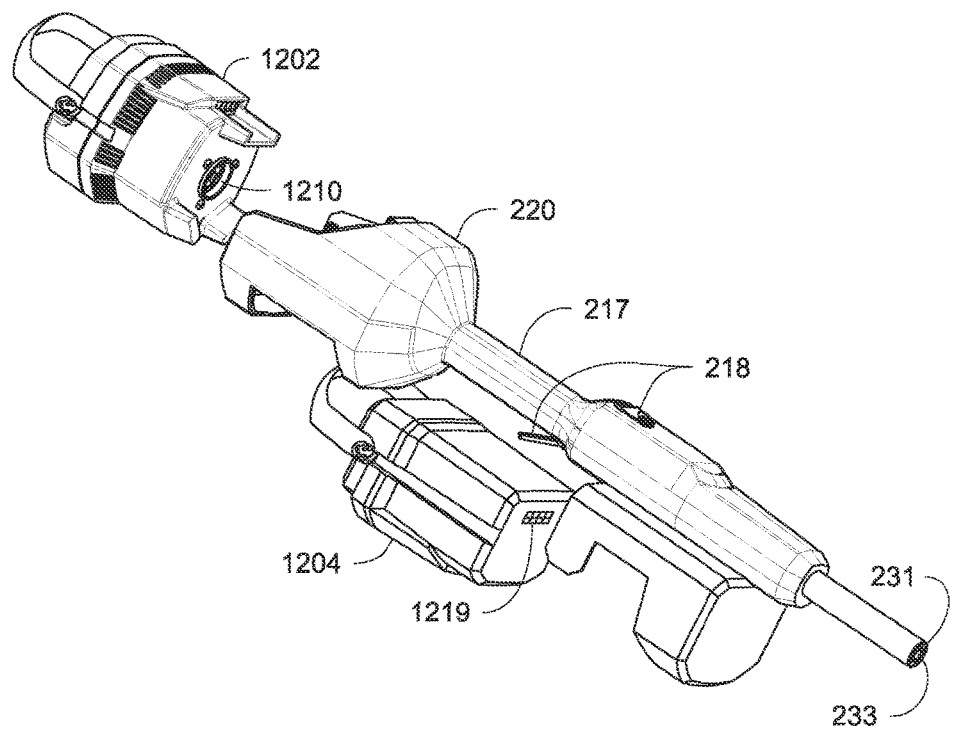

FIG. 4B illustrates a power head 220 in accordance with another embodiment of the disclosure that utilizes the motor 1202 and battery 1204 of FIGS. 3A and 3B, respectively.

While the design illustrated in FIG. 4B varies from that illustrated in FIG. 4A (e.g., utilizes a different battery and motor), it still includes many of the same features (e.g., user interface (handle 217 and controls 218)) as the power head shown in FIG. 4A. Moreover, FIG. 4B specifically illustrates that the tool coupler 231 may, as shown, contain a driveshaft 233. The driveshaft 233 may connect to, and be driven by, the output shaft 1210 of the motor 1202 such that working tools (e.g., edger, trimmer, pole saw, etc.) may be powered when attached to the tool coupler 231.

Figure 5A:
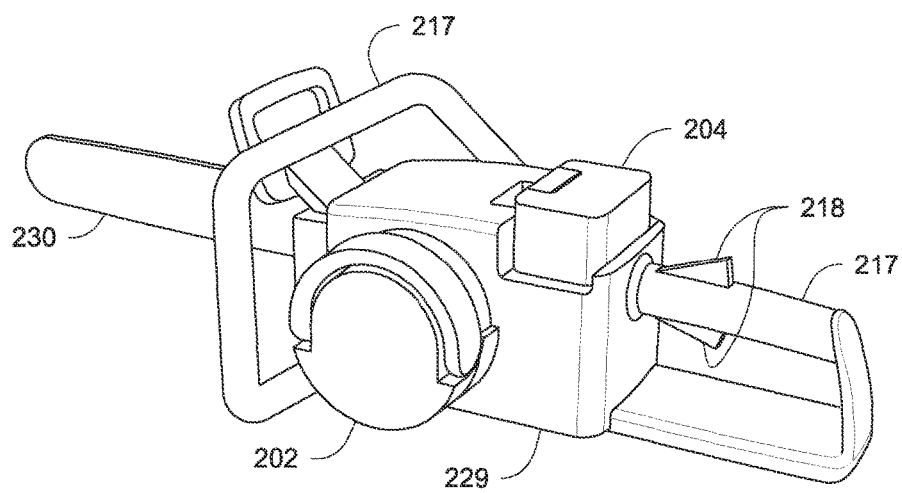
Figure 5B:
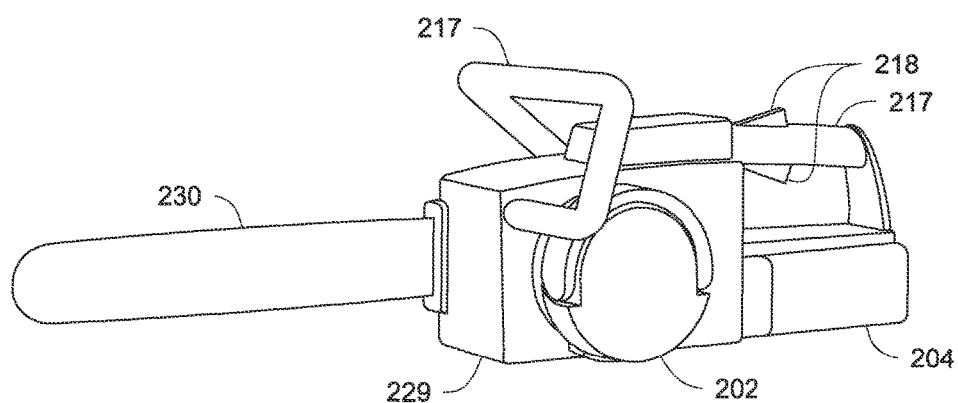
Figure 5C:
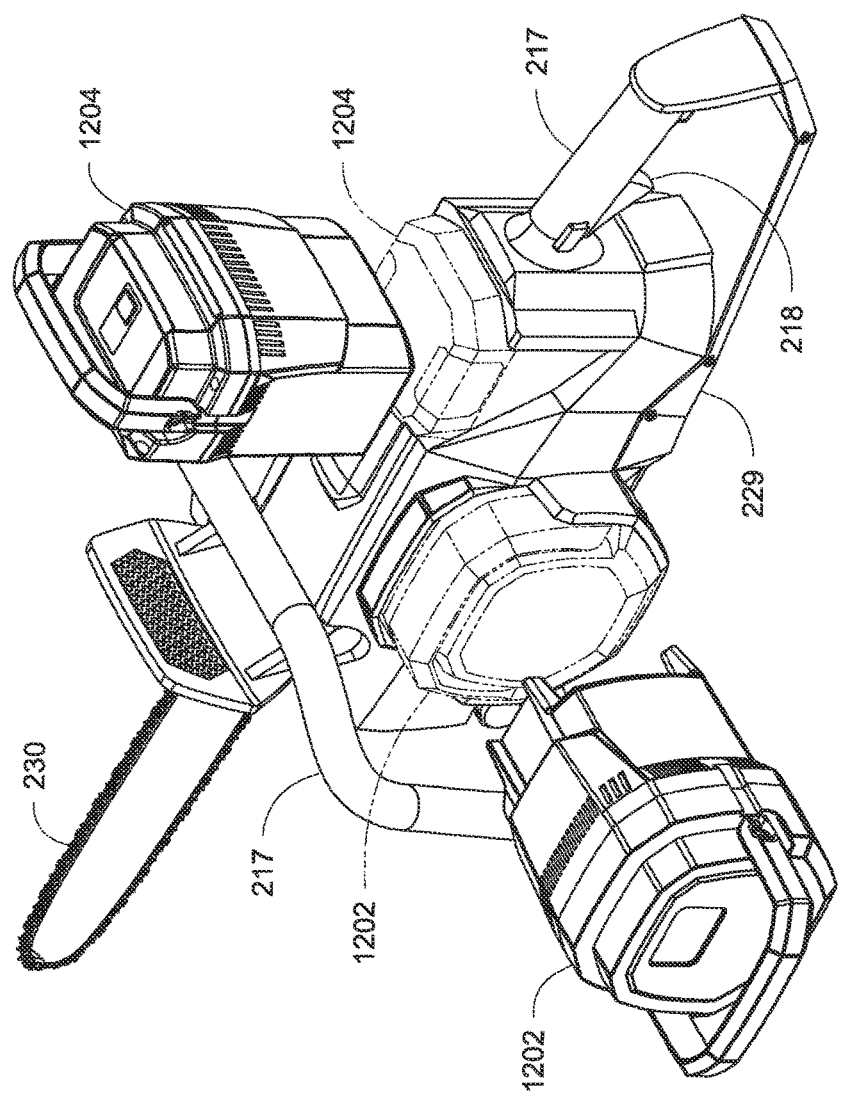

FIGS. 5A-5C each illustrate different embodiments of another exemplary PEU, e.g., a chain saw 229 having a chain 230 (chain shown diagrammatically in FIGS. 5A and 5B) as the working tool. The chainsaw embodiments illustrated in FIGS. 5A and 5B are configured to utilize the motor 202 and battery 204 of FIGS. 2A and 2B, respectively, while the chainsaw illustrated in FIG. 5C is designed to accommodate the motor 1202 and battery 1204 of FIGS. 3A and 3B, respectively. As with the other PEUs described elsewhere herein, the chainsaw 229 may include a user interface (e.g., handles 217 and controls 218) to assist the operator during use.

In the embodiment illustrated in FIG. 5A, a housing of the chainsaw may include a vertically-oriented battery receptacle to receive the battery 204 (e.g., via a vertical drop-in motion), while the chainsaw 229 illustrated in FIG. 5B provides for a horizontal, slide-on (e.g., external) battery mount. Such variation in battery positioning may be beneficial to obtaining a more ideal weight distribution for the PEU. The chainsaw embodiment illustrated in FIG. 5C again opts for a drop-in battery receptacle to receive the battery 1204. In this latter view, the motor 1202 and battery 1204 are shown both before installation (solid lines) and as installed (broken lines).

FIGS. 6A-6E illustrate various embodiments of yet another exemplary PEU, e.g., a handheld debris or "leaf" blower 240. The blowers illustrated in FIGS. 6A-6D may each utilize the motor 202 and battery 204 of FIGS. 2A and 2B, respectively, while the blower illustrated in FIG. 6E may utilize the motor 1202 and battery 1204 of FIGS. 3A and 3B, respectively. As shown in each of these embodiments, the motor 202 (or 1202) may be mounted to a body of the blower such that it is co-axial with a conventional axial blower fan/impeller (not visible) contained within the housing. Such mounting may simplify interconnection of the output shaft of the motor with the blower fan. However, other embodiments are contemplated where such a coaxial arrangement is not present.

Figure 6A:
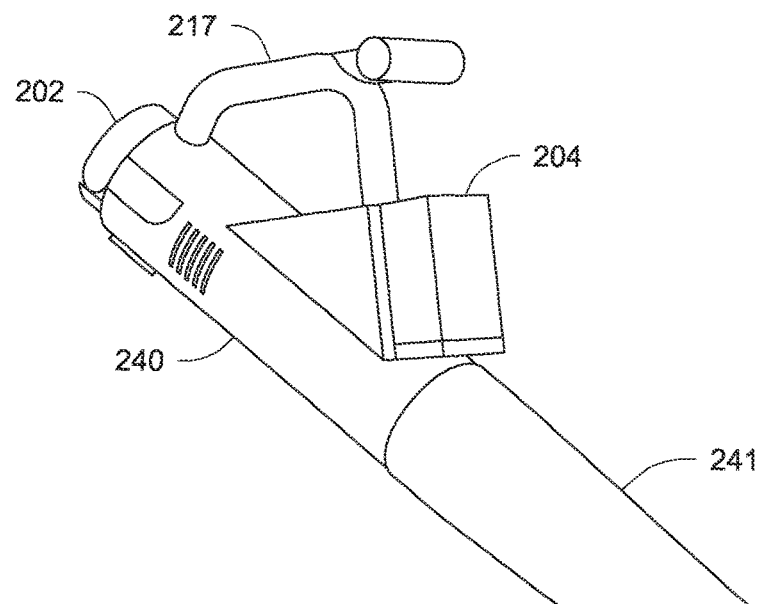
Figure 6B:
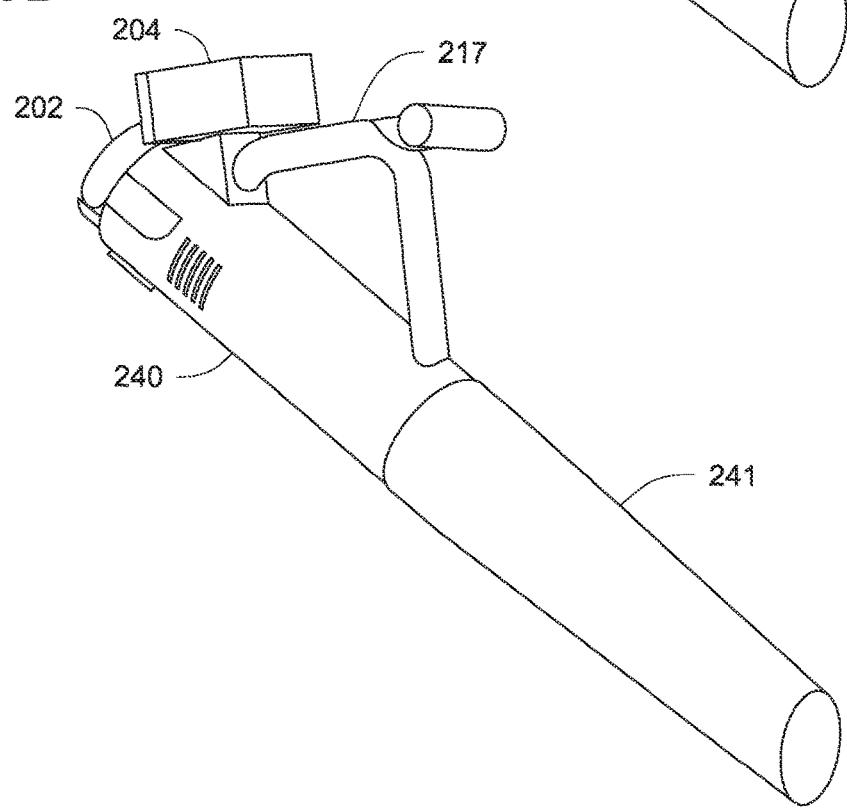
Figure 6C:
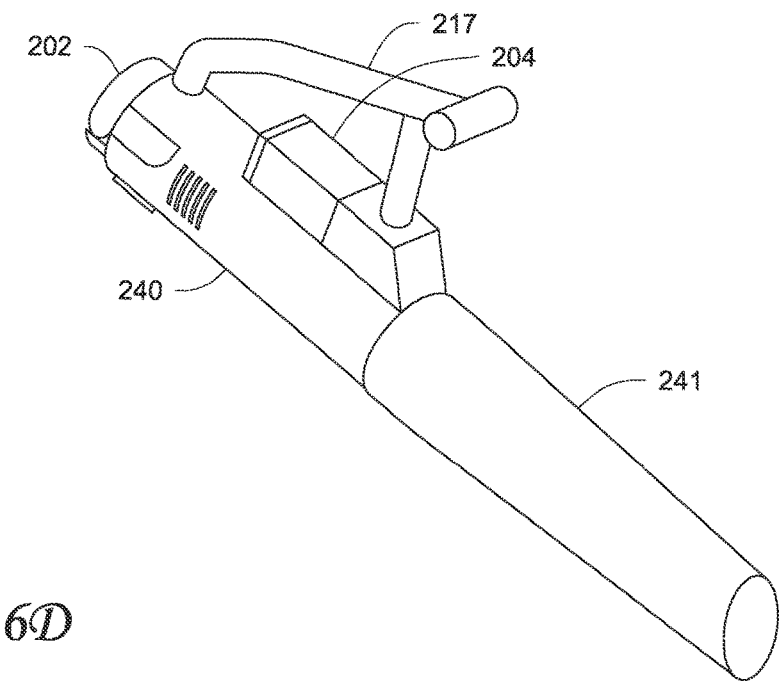
Figure 6D:
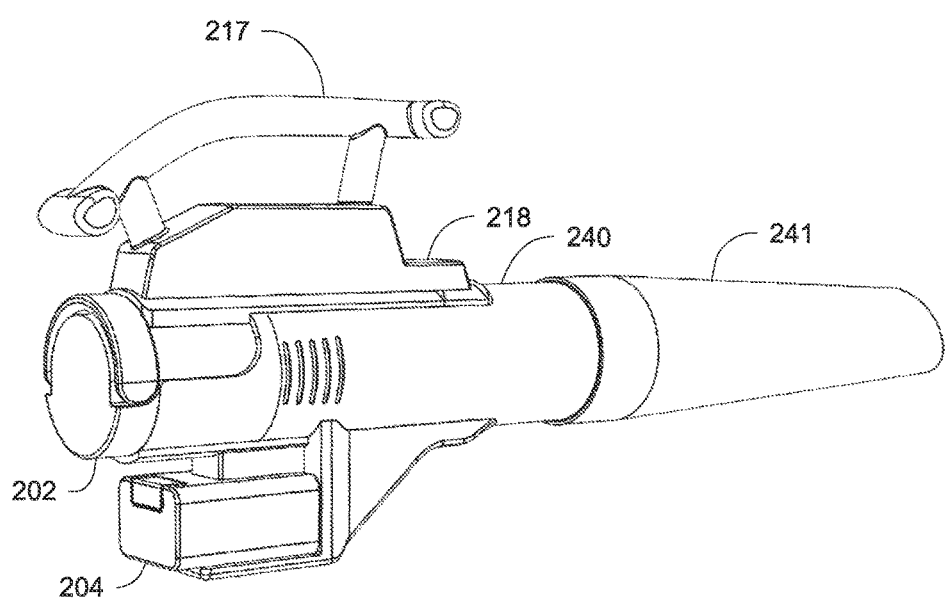
Figure 6E:
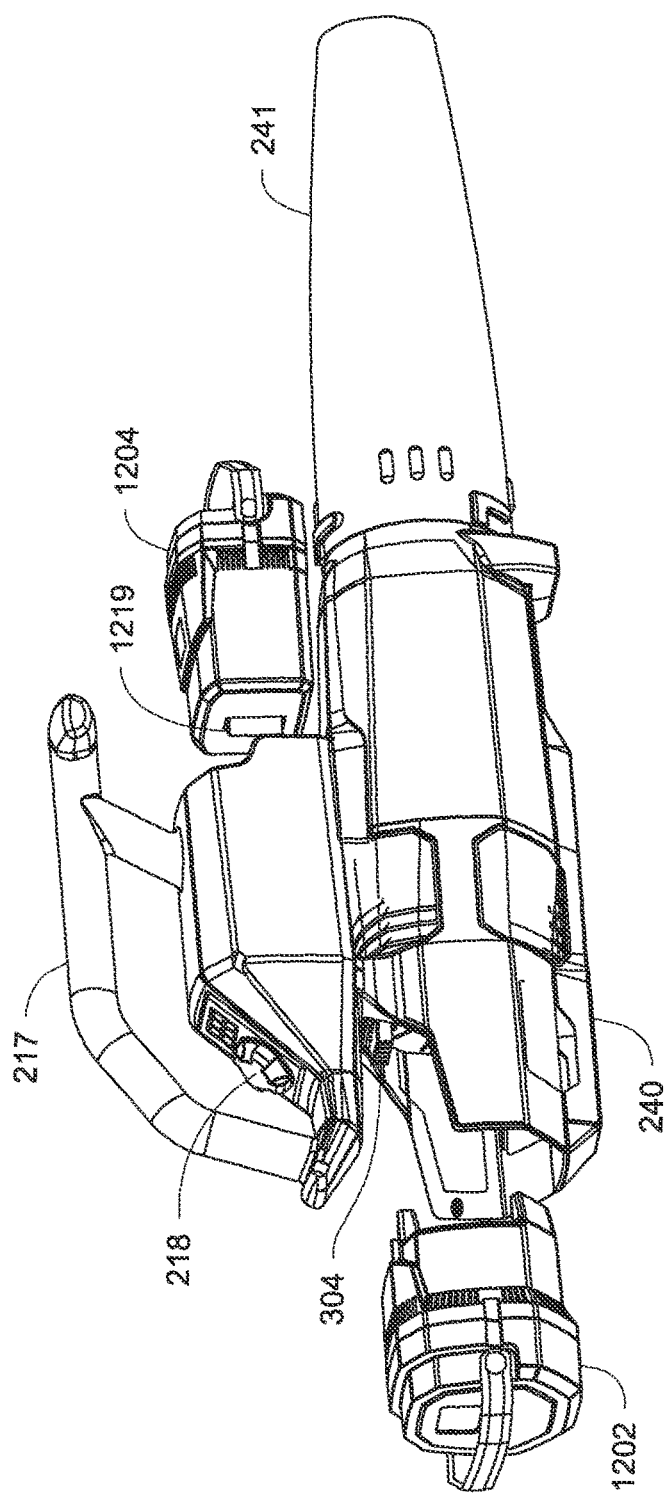

As shown in FIG. 6A, the blower 240 may again include a user interface (e.g., handles 217 and controls (not shown in FIGS. 6A-6D, but see rheostatic (variable) switch 218 in FIG. 6E)) to assist the operator during blower use.

FIGS. 6A-6D are similar in many respects, but do differ in how the battery 204 is accommodated on the body of the blower. For example, the blower 240 of FIG. 6A locates the battery 204 forward of the handle 217 and proximate a blower tube 241, while the blower illustrated in FIG. 6B locates the battery toward the rear of the unit (e.g., proximate the motor 202). Still further, the embodiment illustrated in FIG. 6C, locates the battery above and more toward the middle of the blower body (e.g., beneath the handle 217), while the blower of FIG. 6D locates the battery 204 below the blower body. Again, depending on the weight of the various components of the blower, these different battery locations may provide different weight distribution profiles, thus providing design options that may improve user comfort during use. Finally, the blower 240 depicted in FIG. 6E is configured to receive the motor 1202 and battery 1204 as shown (both motor and battery are shown immediately preceding attachment with the body of the blower).

Figure 7A:
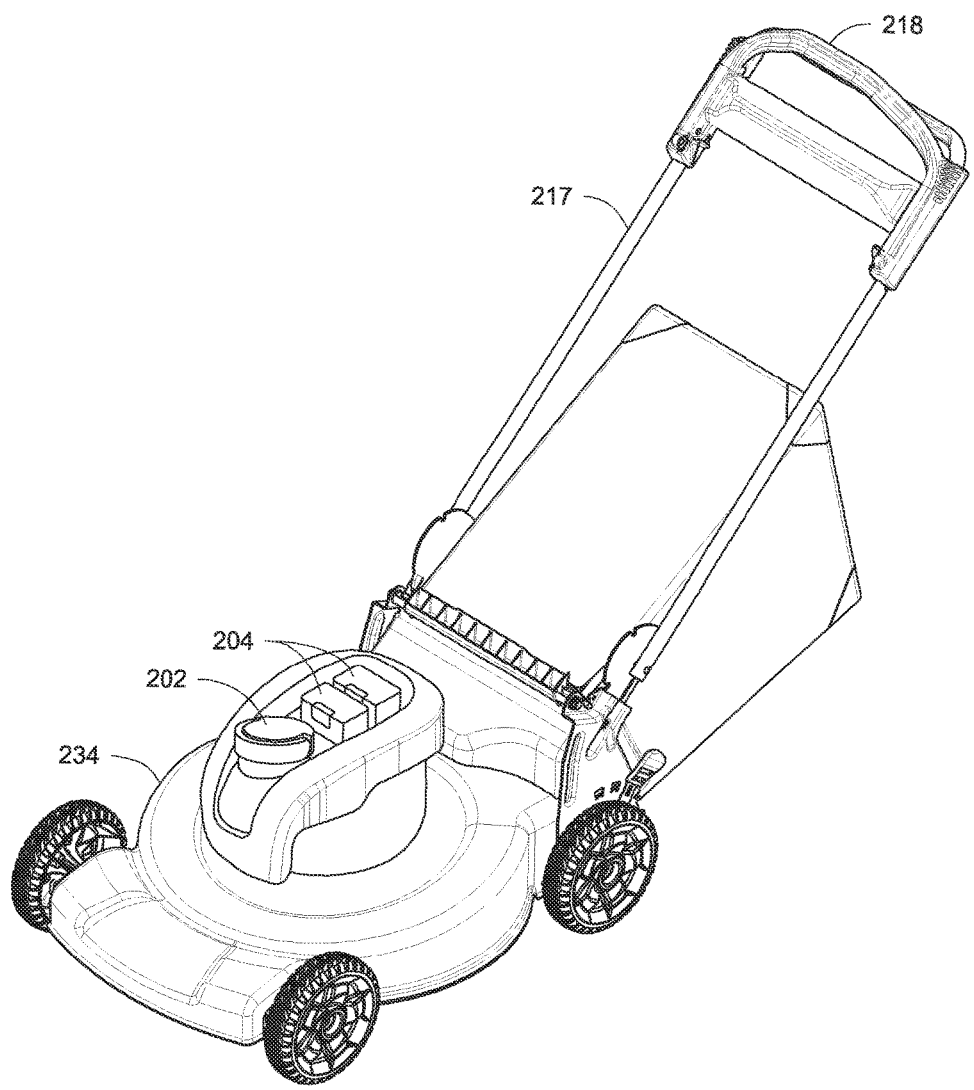
Figure 7B:
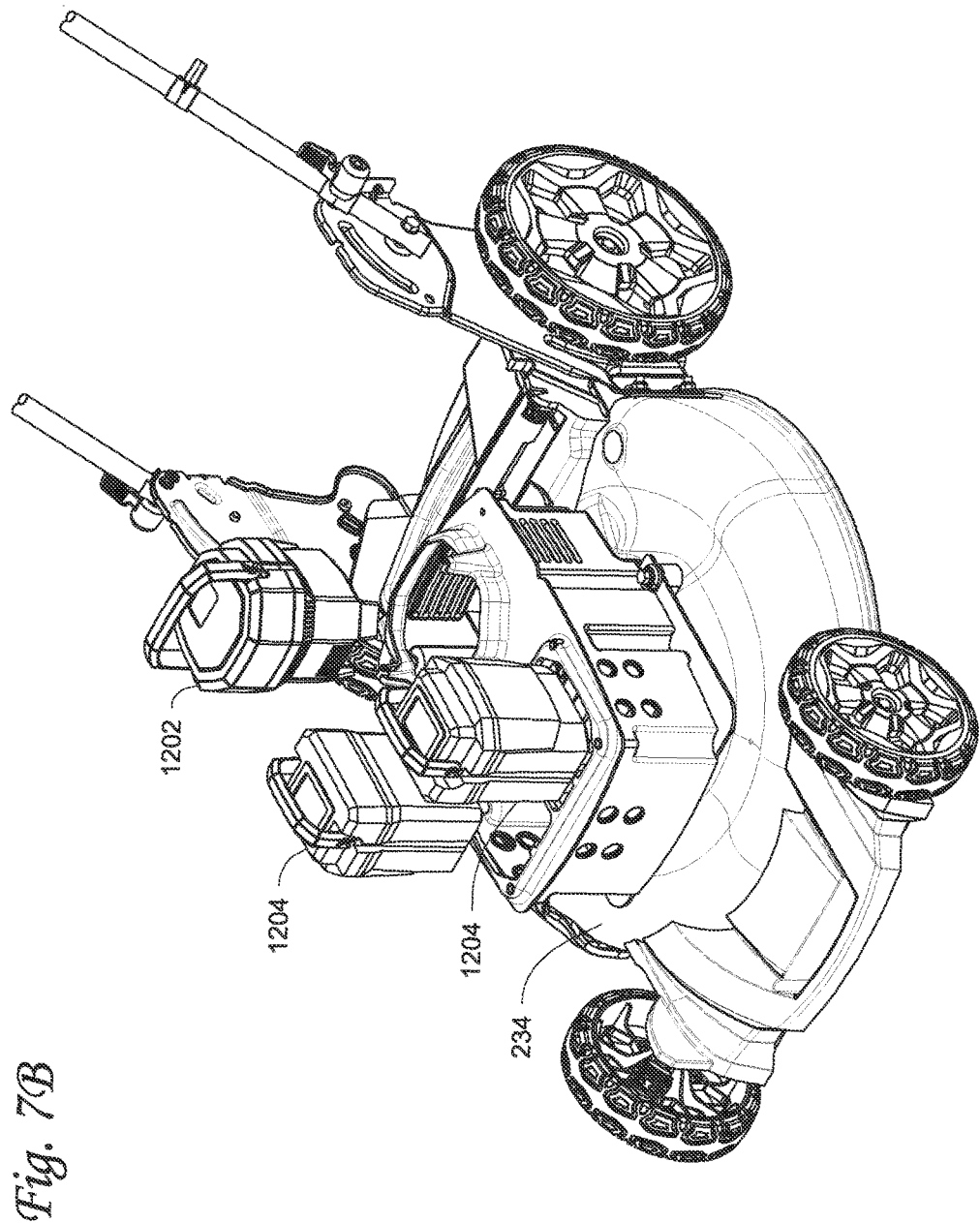

FIGS. 7A-7B each illustrate another exemplary PEU, e.g., a walk behind lawn mower 234, in accordance with two different embodiments of the disclosure. FIG. 7A illustrates the mower 234 (which is conventional in the sense that it includes a deck, ground supporting wheels, and a rotatable cutting blade (not shown)) utilizing the motor 202 and two batteries 204 of FIGS. 2A and 2B, respectively, while FIG. 7B illustrates another mower 234 utilizing the motor 1202 and two batteries 1204 of FIGS. 3A and 3B, respectively. As with the other PEUs described herein, each of the mowers shown in FIGS. 7A and 7B incorporates a user interface (e.g., controls 218 (e.g., bail) and handles 217, neither of which is shown in FIG. 7B, but see FIG. 7A) that may be unique to the type and style of the PEU. The motor 202 (or 1202) may, when powered by the batteries 204 (or 1204), cause the cutting blade (not shown) to spin underneath the deck and cut vegetation over which the deck rolls during use.

With this brief introduction of exemplary PEUs, various aspects of the system 100 and its operation are now described. For brevity, the following description may refer to the motor 202 and battery 204. However, those of skill in the art will realize that the motor 102 (or 1202) and the battery 104 (or 1204) may be substituted for the motor 202 and battery 204, respectively, in the following description without departing from the scope of this disclosure.

Figure 8A:
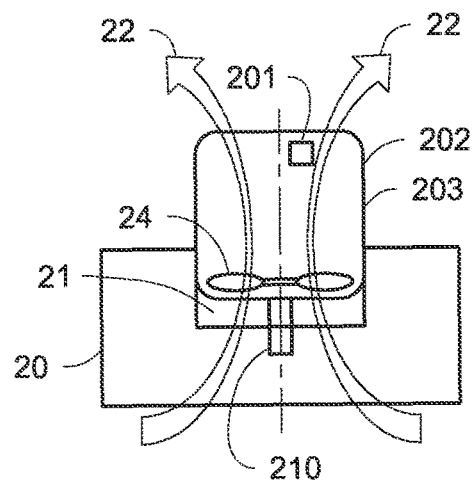
Figure 8B:
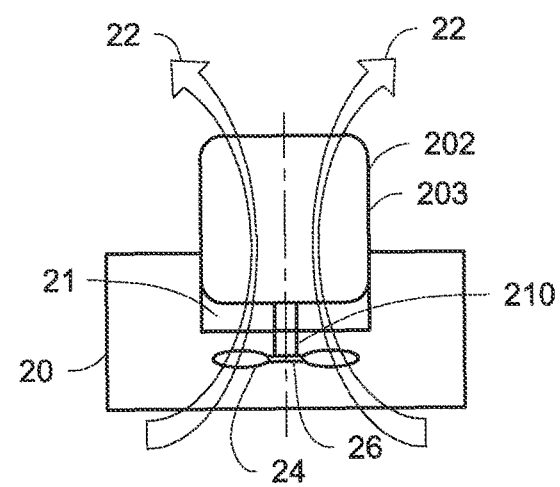
Figure 8C:
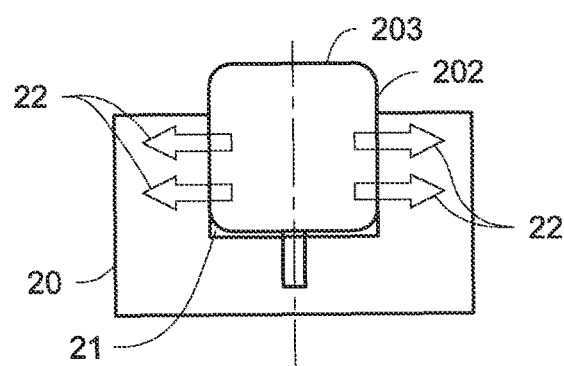

To ensure adequate cooling of the motor 202 during operation in one or more of the PEUs, a cooling subsystem may be provided. For example, FIGS. 8A-8C diagrammatically illustrate the exemplary motor 202 as it may be installed into a motor receptacle 21 formed in a body of a generic PEU 20 (which may be any exemplary PEU including, but not limited to, any of the PEUs described herein). As shown in FIG. 8A, the motor may include a fan 24 contained within the motor housing 203. When the motor is running, the fan 24 may draw cooling air 22 in through cooling vents (see, e.g., vents 108 in FIG. 1) located on a lower side of the motor housing 203 (such vents being in communication with corresponding vents formed on the PEU) and pass the air over the motor coils and motor electronics (e.g., over the motor controller 201). The cooling air may then be exhausted through exhaust vents formed on or near a top of the motor housing. By exhausting air through the top of the motor, it is likely that debris that finds its way onto the top of the motor will be dispersed away from the PEU rather than being drawn into the motor housing. While shown as routing air upwardly through the motor housing 203 in FIG. 8A, such an embodiment is illustrative only. For example, the fan 24 may draw air downwardly (e.g., the reverse of what is illustrated in FIG. 8A) in other embodiments.

FIG. 8B illustrates an alternative embodiment of a cooling subsystem wherein the fan 24 is external to the motor housing 203, e.g., it is located within the body of the PEU 20. The fan 24 may, in this embodiment, be connected to a driven shaft 26 of the PEU that is powered by the output shaft 210 of the motor 202. Accordingly, the fan 24 of FIG. 8B may be able to force cooling air 22 into the PEU 20 and into the motor housing 203 where it is used to cool motor components (e.g., coils, electronics). The cooling air 22 may then, like the embodiment of FIG. 8A, exhaust out the top of the motor housing (or, alternatively, exhaust downwardly (i.e., the reverse flow of what is indicated in FIG. 8B)).

In both of the embodiments shown in FIGS. 8A and 8B, the PEU 20 may provide various vents and openings (not shown, but see vents 108 on motor housing 103 in FIG. 1, and vents 1208 on the motor housing 1203 of FIG. 3A) that permit the fan 24 to draw air through the PEU and motor housing 203.

FIG. 8C illustrates an alternative embodiment wherein the fan is removed. Instead, heat 22 is removed from the motor housing 203 via conduction through the PEU 20. Such a configuration may be used as an alternative to, or in addition to, the convective cooling systems of FIGS. 8A and 8B.

Figure 9:
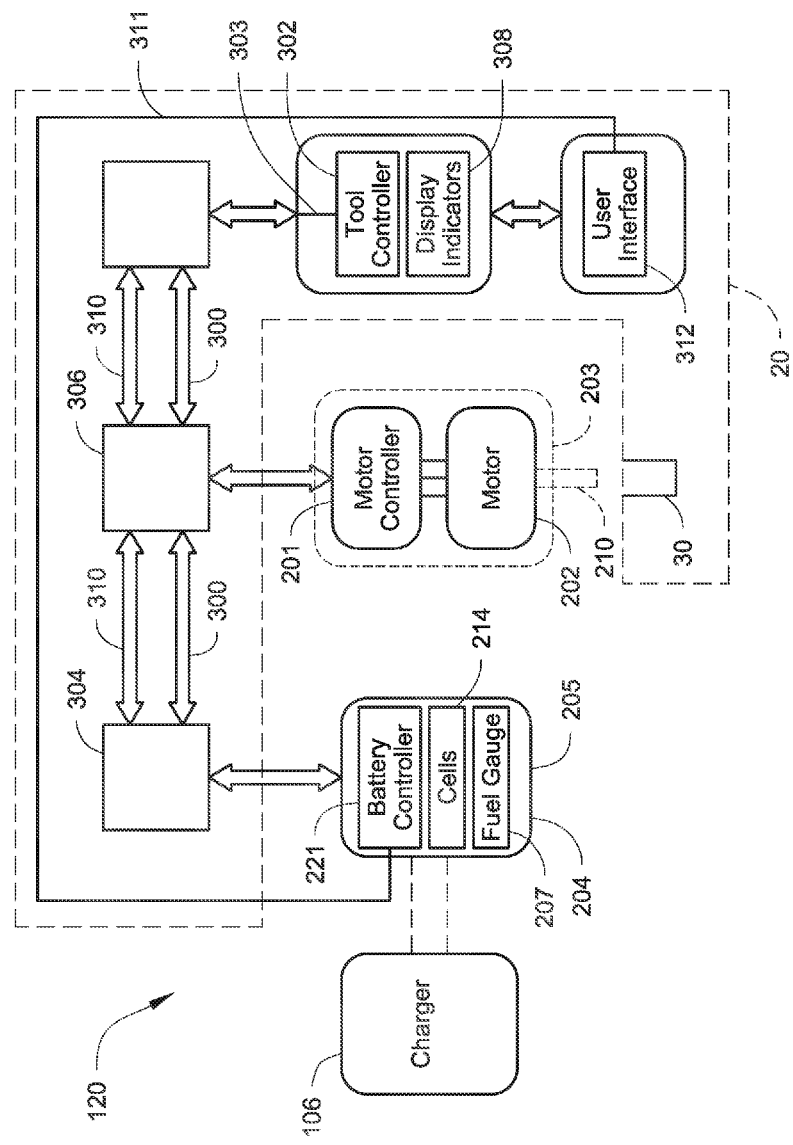
FIG. 9 illustrates a diagrammatic view of a communication structure for a power equipment unit in accordance with one embodiment of the disclosure.

FIG. 9 illustrates an exemplary communications bus 300 that may be included on any or all of the PEUs 20 (e.g., the power head 120, 220, the chain saw 129, 229, the auger 130, the roto-tiller 132, the mower 134, 234, the snowthrower 136, the backpack blower 140, and the handheld blower 140, 240), as well as the inverter power pack 142, of the system 100. As used herein, "communications bus 300" refers to a bus adapted to communicate one or more electrical signals (e.g., signals representing commands (from the user interface 312 or from a PEU-based tool controller 302), status/ operating parameters of the tool, battery 204, or motor 202, etc.) between any two of the battery controller 221, motor controller 201, and tool controller. As a result, the communications bus may encompass any device ranging from one or more simple electrical conductors, to a more sophisticated, multi-conductor bus (e.g., a serial communication link or an intelligent controller area network (CAN) bus) capable of providing bi-directional communication between two or more of the motor 204, the battery 202, and the PEU 20/tool controller 302.

For example, in one embodiment, the communications bus 300 could provide identity information to the motor controller 201 and/or battery controller 221 merely by simple mechanical interaction of electrical contacts located on the motor housing 203 with associated contacts located on the PEU 20 housing (e.g., within the receptacle 21 of the housing 20 (see FIG. 8A)). In one embodiment, the motor housing 203 could incorporate three or more contact pins (e.g., pins 1, 2, and 3; not shown). In a first power equipment unit, the PEU receptacle 21 receiving the motor 202 may include electrical contacts that merely connect or "jumper" pin 1 to pin 2. This would register first identity information to the motor controller 201, instructing it to operate according to a first operating profile (e.g., operate with a first maximum speed, torque, or power) that corresponds to the first PEU. However, the receptacle 21 receiving the motor 202 in a second PEU may instead jumper pin 1 to pin 3, thereby registering second identity information to the motor controller 201 instructing it to operate according to a second operating profile that is different than the first operating profile. Of course, any number of pins and any number of jumper configurations could be provided to yield most any number of operating profiles. Accordingly, in one embodiment, the tool controller 302 may simply be an array of pins (different on each PEU 20) that jumper appropriate pins located on the motor 202.

In another embodiment, the tool controller 302 may be an electronic module that, among other duties, provides static identity information (e.g., one or more electrical identity information signals) regarding the PEU 20 to the motor controller 201 and/or battery controller 221 (assuming the motor and battery are attached) via the communications bus 300. Again, this identity information may include a command, or series of commands, that limit or otherwise set various operating parameters of the motor 202 and/or the battery 204 corresponding to the specific PEU and its associated working tool.

As used herein, "identity information" refers to any information that defines to the motor and/or the battery the desired motor and/or battery operational characteristics or "operating profile" for the specific power equipment unit. For each PEU, identity information may include, but is not limited to: a maximum or minimum speed, torque, or power to be supplied by the motor and/or battery; an acceleration response (rate of increase or decrease of speed) of the motor; tool (e.g., motor output shaft) direction; overload threshold (further described below) at which the motor and/or battery may initiate an action; and required motor stop time characteristics (e.g., time to full motor stop once a stop command is issued). Changing the motor's stop-time characteristics may be useful for certain PEUs. For example, it may be desirable that the stop-time for a chainsaw be nearly instantaneous, while the stop-time for other PEUs (e.g., debris blowers) may merely be based upon the natural power-off characteristics of the motor/PEU (e.g., coast-to-stop). As further described below, the identity information could be one or more static instructions or, alternatively, could include dynamically changing instructions (e.g., based on feedback signals from the motor and/or the battery).

Accordingly, the tool controller 302 may, when powered (e.g., by the battery 204), provide, via the communications bus 300, one or more electrical identity information signals 303 identifying the PEU to the motor controller 201 and/or to the battery controller 221 via electrical connections 306 and/or 304, respectively. These signals 303 may, when received by the motor controller 201, cause the motor controller to set one or more operational characteristics such as maximum speed, maximum torque and/or maximum power (and/or any other operating parameter (e.g., acceleration response) that may be included within the identity information) of the motor. Accordingly, when the user then provides a PEU input command (e.g., when the user commands the tool to a maximum output setting via the user interface), the motor controller 201 may artificially limit the maximum speed (revolutions per minute or RPM), the maximum torque, and/or the maximum power of the output shaft to a level less than the motor's capability. Such limits would be fixed by the identity information signals 303 based upon a predicted operating profile of the specific PEU as programmed in the identity information. While motor output parameters may be so limited, the PEU would, of course, respond to real-time, user commands (e.g., turn on, turn off, change speed, etc.) within the constraints set by the identity information signals.

Many PEU-specific operational characteristics may be satisfactorily implemented using such static identity information signals. However, in another embodiment, the tool controller 302 may assume a more dynamic and active role in PEU operation. For example, the tool controller could, in real-time, not only transmit identity information containing operational characteristics to the motor controller 201 and/or battery controller 221 via the bus 300 as described above, but could also receive real-time feedback from the motor controller and/or battery controller that reflect actual PEU operational conditions. Such feedback could then be used by the tool controller 302 to alter its instructions (e.g., alter its identity information signals 303) in real-time to adjust motor performance and/or battery utilization. Accordingly, instead of merely providing static identity information for a specific PEU, the identity information signals 303 could be bi-directional and dynamic, allowing the tool controller 302 to function as a closed-loop controller that revises its instructions to the motor and/or battery in response to feedback received.

Allowing the tool control 302 to provide such dynamic motor and battery control may provide certain advantages. For instance, such functionality may allow future upgrades to PEU features, as well as support for new PEUs in which speed, torque, power, and other desired operational characteristics are not yet known. Additionally, a dynamic tool controller 302 may allow for additional features such as a simulated governor response as further described below.

While the identity information signals may be used to control the speed and torque of the motor output shaft, some PEUs may utilize onboard gearing to achieve the desired speed of the working tool. For example, where the PEU is a lawn mower like the mower 234 of either FIG. 7A or 7B, speed and power reduction could be accommodated on the mower itself (e.g., the motor 202/shaft 210 could connect to a mower pinion gear that, via a toothed belt, drives a larger gear attached to a spindle driving the cutting blade). In other embodiments, speed and/or power reduction may be achieved via direct gear reduction, friction disks, etc. As a result, the motor may be able to operate at a higher (or lower) speed than a speed of the working tool without departing from the scope of this disclosure. When the PEU is designed to address final drive parameters based upon its own gear reductions, a tool controller like that described herein may be simplified or even made entirely optional.

As stated above, the communications bus 300 may also communicate with the battery controller 221 via the electrical connection 304. For example, the battery controller 221 may provide information regarding the battery charge state (e.g., a "fuel gage") to the tool controller 302 via the communications bus 300. Such information, which may also be provided on a display 207 on the battery, may then be optionally displayed via a display indicator 308 associated with a user interface 312 on the PEU.

The battery 204 may, in some embodiments, provide power to the motor 202 via a power bus 310. In one embodiment, the power bus 310 may be incorporated into the same electrical connections 304 and 306 as the communication bus 300 so that only one connector is required for each of the battery (see, e.g., contacts 1219 in FIG. 4B) and the motor (see, e.g., connector 244 in FIG. 10B). Although not typically used in conjunction with PEU 20 operation, FIG. 9 also illustrates the charger 106, which may electrically couple to the battery 204 when the latter is removed from the PEU.

FIG. 9 further illustrates a signal line or wake bus 311 connecting the battery controller 221 to the user interface 312. The wake bus 311 may allow the buses 300 and 310 to shut down during periods of inactivity to preserve battery charge. However, when the PEU 20 is again activated by the operator (e.g., via manipulation of a control (e.g., trigger) associated with the user interface 312), a signal is sent to the battery controller 221, via the wake bus 311, to energize the buses 300 and 310 for PEU operation.

As one can appreciate, embodiments of the power equipment system 100 may provide PEUs each having a unique user interface 312 including controls, indicators, and the like that are intuitive for the specific PEU. For example, in one embodiment, the user interface 312 may merely include a handle and an on-off switch, the latter providing selective power to the motor (e.g., motor 202) to energize the working tool. However, as stated above, in other PEUs the user interface may include other controls, e.g., operator presence controls, variable speed controls, overload indicators, battery or "fuel" gages, battery or motor temperature indicators, etc. that may be useful when operating specific PEUs.

One or more PEUs (or the motor) of the system 100 may also include a motor load sensing subsystem designed to protect the motor and battery(s) from overload. In some embodiments, the load sensing subsystem may mimic actions of a typical gasoline engine by providing what is referred to herein as a simulated "governor response." For example, during operation, the current drawn by the motor 202 may be monitored, e.g., by the motor controller 201, battery controller 221, or the tool controller 302. When motor speed or power reaches (or approaches) an overload threshold established by the identity information signal (which again may be different for different PEUs), the motor controller 201, battery controller 221, and/or tool controller 302 may automatically reduce the output speed (or power) of the motor. This slowing of the motor (and the corresponding slowing of the working tool) provides the operator with an audible and/or tactile indication that the PEU 20 is operating outside of normal parameters, much like a gasoline mower might slow when moving through deep or wet grass. Accordingly, PEUs of the system 100 may provide load feedback that is intuitively understood by users typically familiar with gas-powered devices. Of course, such audible and/or tactile feedback may be augmented by providing other warnings, e.g., a light or audible alarm, associated with the user interface 312.

The term "motor controller" is used herein to refer to an electronic module that is capable of receiving various electrical signals (e.g., the identity information signal 303) and, via pre-programmed logic, take a particular action. For example, upon receiving the identity information signal of the PEU, the motor controller may respond by setting a maximum speed or maximum power of the motor's output shaft to correspond with the identity information signal. The motor controller may further, in some embodiments, be able to generate and transmit signals, via the communications bus 300, regarding parameters of the motor (e.g., speed, temperature, etc.). Moreover, if the identity information signal also includes an overload threshold (e.g., the maximum current draw allowed from the battery), the motor controller may cause the motor to slow or otherwise reduce output once the threshold is reached (or, alternatively, shut the motor off).

The term "battery controller" is used herein to refer to an electronic module that controls various functions of the battery. For example, the battery controller may: control the discharging and recharging of battery cells (see, e.g., cells 214 in FIG. 9); monitor the temperature of the cells; monitor the charge level of the cells individually and/or collectively (which collective level may be displayed on an integral fuel gauge and/or on the user interface); and manage any other battery process. The battery controller 221 may also be able to report any data collected from the battery to the communications bus 300 for use by, e.g., the tool controller 302 or the motor controller 201. Moreover, the battery controller 221 may be able to take certain actions in lieu of the motor controller. For instance, the battery controller could receive the identity information signal from the tool controller and react accordingly by reducing battery output (e.g., to effectively limit the maximum output of the motor or to reduce power to the motor when the overload threshold is reached), or, alternatively, by shutting battery power off.

In one embodiment, one or both of the battery controller and the motor controller may be a microprocessor-based controller able to receive and transmit signals, execute pre-programmed logic or computer programs based thereon, and output signals and commands accordingly. As a result, each controller may include data storage/memory modules (e.g., volatile and nonvolatile memory), a microprocessor, and any other components necessary to achieve the described functionality.

The term "tool controller" may be used herein to refer to any mechanism that is capable of communicating one or more parameters associated with the PEU to the communications bus 300. In one embodiment, this may merely be the pin jumper configuration described above. In another embodiment, the tool controller may be a passive electronic module operable to provide fixed identity information signal(s) to the battery and/or the motor. In yet another embodiment, the tool controller may be an electronic module that is capable not only of storing non-volatile data regarding the identity of the tool (e.g., maximum output or speed needed by the mower, overload threshold, etc.) and outputting a signal or signals representative thereof when powered or queried, but is also able to dynamically adjust the operating parameters of the motor and/or battery, via the identity information, in response to PEU operating conditions. That is, the tool controller 302 may be configured as a closed loop controller capable of receiving data regarding the battery 204 and/or the motor 202, and adjusting motor and/or battery operating parameters based thereon.

In the embodiments illustrated herein, each PEU may include the motor interconnect 306 adapted to electrically couple with a connector on the motor housing as described below, and the battery interconnect 304 adapted to electrically connect with a connector on the battery housing. Each PEU may also include a motor coupler 30 adapted to mechanically interconnect an output member (e.g., the output shaft 210) of the motor with a driven member associated with the PEU/working tool.

Figure 10A:
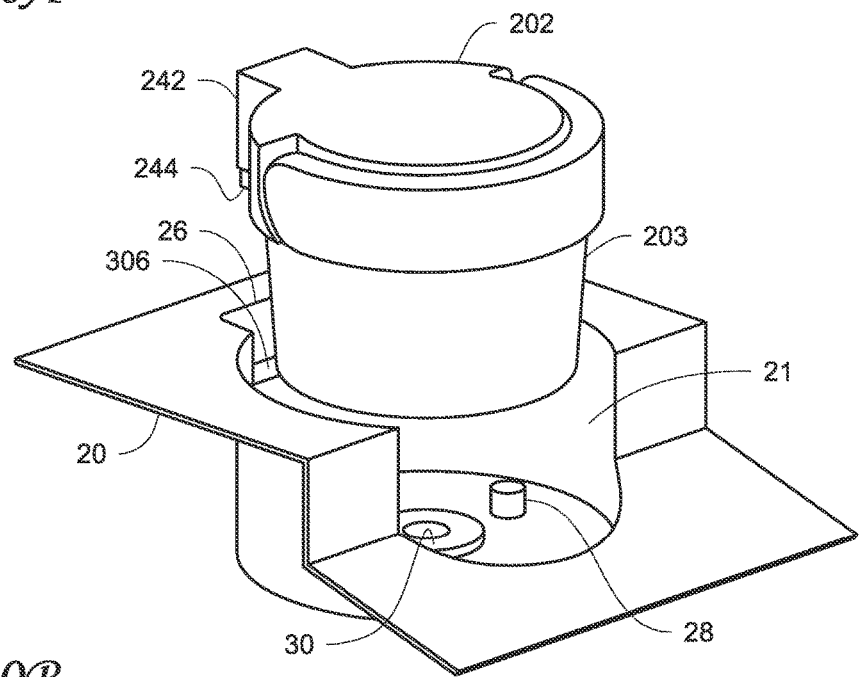

For example, FIGS. 10A-10E illustrate an exemplary method of connecting the motor 202 within the motor receptacle 21 formed in the body of a generic PEU 20. FIG. 10A illustrates the motor receptacle 21 adapted to receive the motor 202. Once again, while shown as fitting within the motor receptacle 21 of the PEU 20, any interconnection that permits secure connection of the motor to the PEU is possible.

Figure 10B:
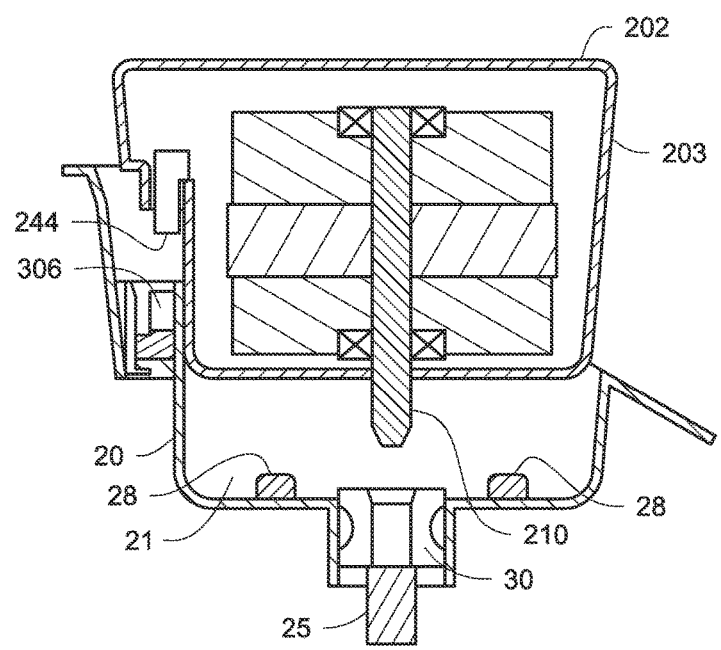

The motor housing 203 may, in some embodiments, include a key 242 that aligns with a keyway 26 formed in the receptacle 21 of the PEU to assist with initial indexing and alignment of an electrical connector 244 formed on the motor housing 203 with the interconnect 306 of the PEU 20. As further shown in FIG. 10A, one or more biasing elements, e.g., rubber bumpers 28, may be provided to isolate the motor housing 203 from direct contact with a lower surface of the motor receptacle 21. FIG. 10B illustrates a section view of the motor 202/motor housing 203 and PEU 20 of FIG. 10A after the motor housing has been initially inserted into the motor receptacle 21.

In some embodiments, the output shaft 210 of the motor 202 may first engage the coupler 30 attached to a driven shaft 25 of the PEU 20. The coupler 30 may have a patterned portion (e.g., internal shape) that matches a patterned portion (e.g., external shape) of an end of the output shaft 210. For example, the output shaft and coupler could connect via a key and keyway, a spline, or a "D" or "double D" shaft shape. In fact, most any interconnection that permits the shaft 210 to engage the coupler 30 in a manner in which it may effectively transmit torque is contemplated. The coupler 30 and/or shaft 210 may have a chamfered lead-in that permits the coupler 30 to move/rotate slightly so that the associated patterned portions come into alignment during motor insertion.

Figure 10C:
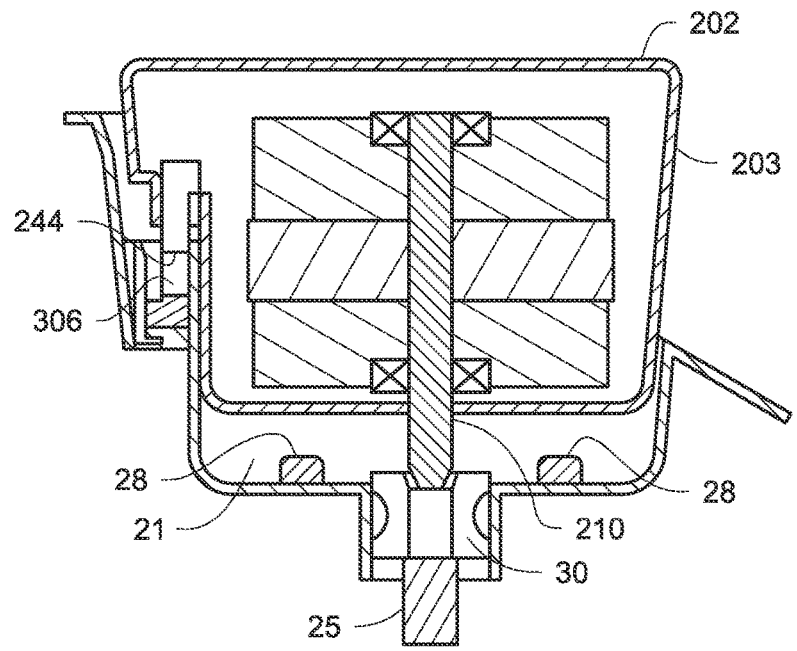
Figure 10D:
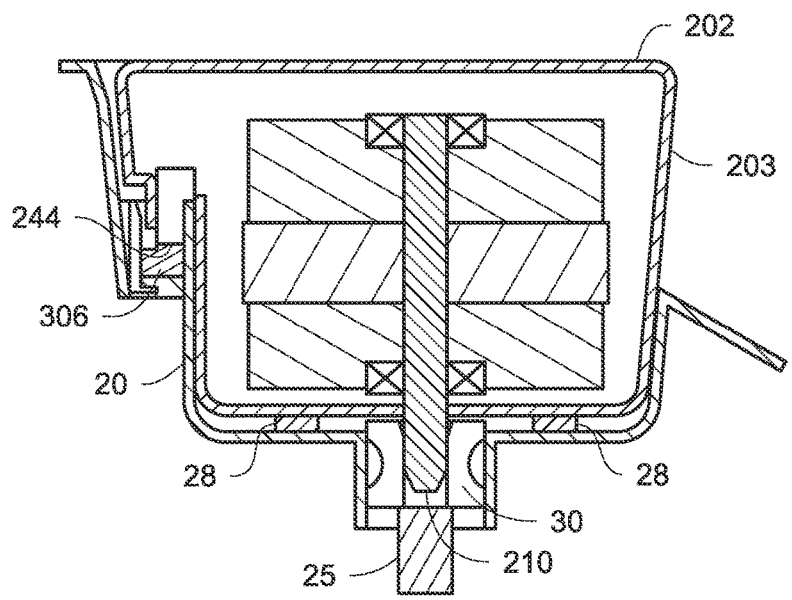

Once the output shaft 210 aligns with the coupler 30, the motor 202 may drop farther into the motor receptacle 21 as shown in FIG. 10C. This additional downward movement of the motor housing 203 allows the connector 244 to couple with the interconnect 306 and allows the motor housing to rest upon the rubber bumpers 28 as shown in FIG. 10D. The bumpers 28 may provide positional compliance in the vertical (in FIG. 10D) direction to account for tolerance variation among the various PEUs 20. They may further assist in vibration isolation/attenuation.

Once the connector 244 and interconnect 306 contact, the communications bus 300 may become active (assuming the battery 204 is also installed on the PEU), thereby permitting the PEU to provide an identity information signal to the motor controller 201 and/or battery controller 221 (see, e.g., FIG. 9).

Figure 10E:
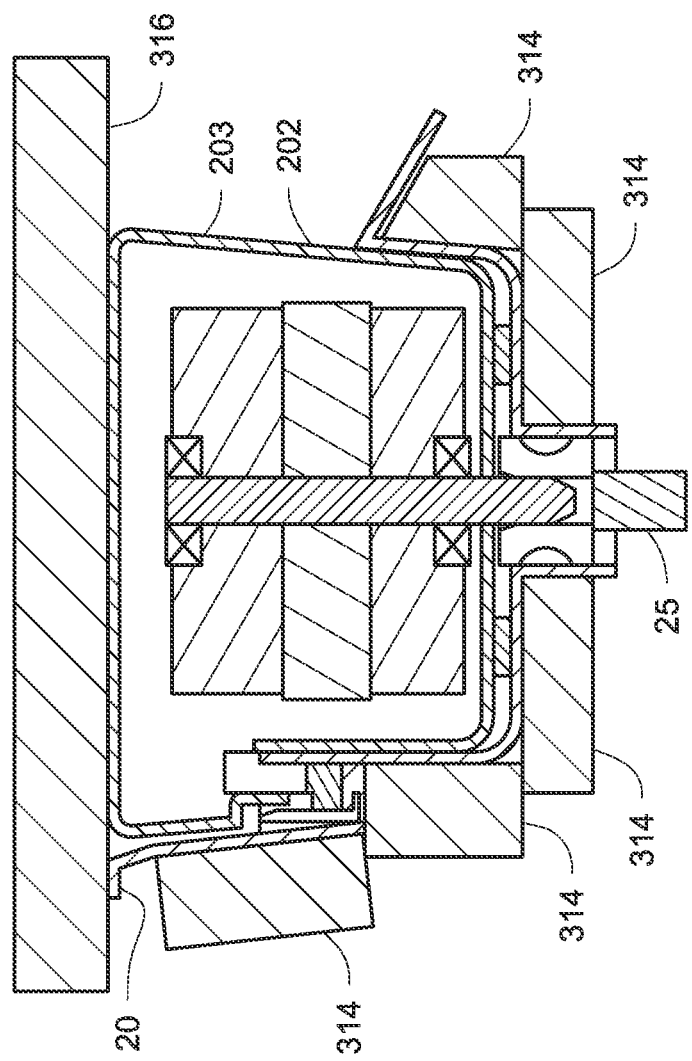

Once the motor is fully installed as shown in FIG. 10E, it may be constrained (e.g., by interaction with the surfaces of the motor receptacle 21 against rotational, radial, and downward axial motion as shown diagrammatically by the cross-hatched portions 314. However, the motor may still be unrestrained in the upward axial direction 316.

To address this issue, some embodiments of the motor may include a latch mechanism to secure the motor housing 203 relative to the motor receptacle 21 of the PEU 20 in at least the upward axial direction. While indicated in FIG. 2A as achieving this goal with a camming latch associated with the handle 209, such a construction is not limiting. For example, FIGS. 11A and 11B illustrate exemplary latches that could be incorporated into a motor housing 403 (e.g., or housings 103, 203, or 1203), or alternatively, a battery housing.

FIG. 11A shows the motor housing 403 as forming a grasping handle 450 formed by a window 451, the window sized to receive fingers of the operator's hand. When the operator, via the window 451, applies an upward force 452 to the handle 450, a lock member 449 may also be displaced upwardly. As the lock member 449 moves upwardly, it imparts a pivoting motion to one or more (e.g., two) latch member 453, causing each latch member to pivot about an axis 454 in a direction 455. As each latch member 453 pivots, a latch surface 456 associated with each latch member may withdraw into the motor housing 403. That is, each latch surface 456 may disengage from a latch face 458 formed on an inner surface of the motor receptacle 21. As a result, the motor housing 403 may be withdrawn from the motor receptacle (only the right side of motor receptacle 21 is illustrated in section in FIG. 11A) of the PEU.

In some embodiments, the handle 450 and/or latch members 453 may be biased to the illustrated position to assist with locking the motor housing 403 in place once it reaches the installed position. Moreover, the latch surfaces 456 may each have a slanted or ramp surface 457 to allow the latch member 453 to pivot into the motor housing 403 (about the axis 454) during motor housing insertion into the motor receptacle 21, then bias into latching engagement once the latch surfaces 456 reach their respective latch faces 458. The latch face 458 may be located to ensure that the rubber bumpers 28 are somewhat compressed when the latch surface 456 engages with the latch face 458.

FIG. 11B illustrates an alternative embodiment of the latch system shown in FIG. 11A (only one ((e.g., left hand) latch mechanism is illustrated in FIG. 11B, but the motor could again have any number (e.g., two) of such latch mechanisms). Once again, the lock member 449 of the handle 450 may be actuatable through the window 451 and displaceable upwardly by application of the upward force 452. As the upward force is applied to the handle 450, the lock member 449 may pivot about an axis 459. This pivoting motion may cause a lower end of the lock member 449 to move inwardly, where it pushes against a portion of the latch member 453, causing the latch member to pivot in the direction 460 about the pivot 454. As a result, the latch surface 456 may move from its illustrated (e.g., engaged) position, to a disengaged position within the motor housing 403. Otherwise, the latch system shown in FIG. 11B may be substantially similar to the latch system shown in FIG. 11A. Of course, while shown as incorporating the motor latch on the motor housing in both FIGS. 11A and 11B, other embodiments could locate the latch on the PEU 20 itself without departing from the scope of the disclosure.

FIGS. 12A-12D illustrate another exemplary embodiment of a latch system for use with a motor like the motor 202 (or 1202) having a housing with the lift handle 209. In this exemplary embodiment, the motor receptacle (not shown) of the PEU 20 may include a stub pin 502 extending radially into the motor receptacle as shown in FIG. 12A. The motor housing 203 may form a slot 504 that engages the pin 502 as the motor is lowered into the motor receptacle as shown in FIG. 12B. In some embodiments, the slot 504 may converge toward the top of the motor housing 203 as shown. Such a construction may not only guide the motor into the motor receptacle, but may also rotationally index the motor housing relative to the motor receptacle as the motor housing is lowered.

Once the motor housing is fully inserted, a horseshoe-shaped opening 506 formed in the lift handle 209 may engage the pin 502 as shown in FIG. 12C. The lift handle 209 may then be rotated about the axis 211 (e.g., in the direction 508). Once the handle 209 is moved to a fully engaged position as shown in FIG. 12D, a wall of the opening 506 moves beneath the pin, securing the motor housing 203 in place.

Walls of the opening 506 may form a camming surface that forces the motor housing downwardly as the handle 209 is pivoted to the fully engaged position. Moreover, the handle 209 may include a detent or over-center mechanism that keeps the handle 209 in the fully engaged position of FIG. 12D until the operator intentionally manipulates the handle back to the disengaged position of FIG. 12B.

Figure 13:
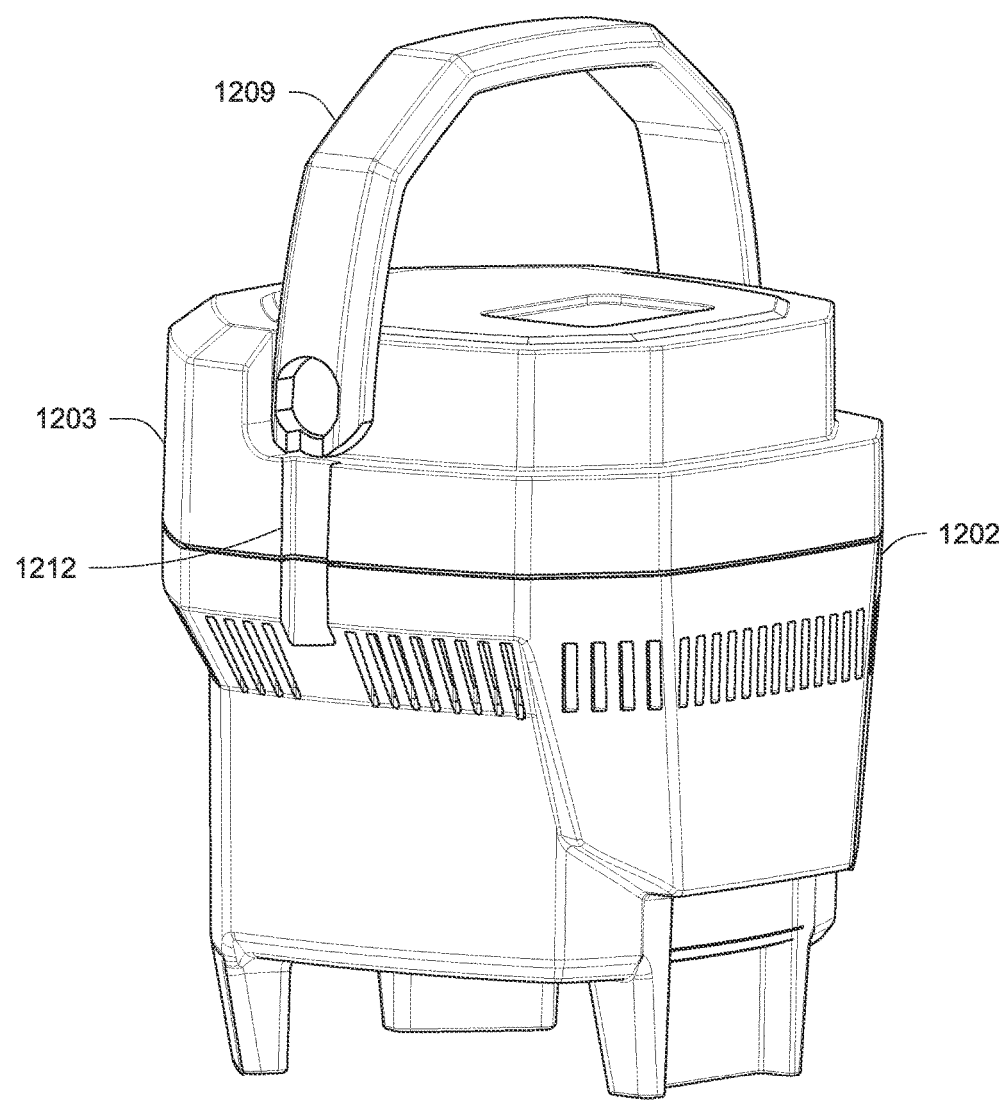
FIG. 13 illustrates a latch system in accordance with an alternative embodiment of the disclosure as it may be incorporated on, for example, the motor of FIG. 3A.

FIG. 13 illustrates how a latching handle similar to that shown in FIGS. 12A-12D could be incorporated onto the motor 1202 of FIG. 3A. As is evident in this view, the motor housing 1203 includes the latching handle 1209 and a slot 1212, the latter adapted to receive a stub pin (not shown) in a manner similar to that described above with regard the motor in FIGS. 12A-12D. Once again, when the motor 1202 is lowered into the motor receptacle formed in the PEU housing, the stub pin (formed on the interior of the battery receptacle) may engage the slot 1212, aligning the motor housing as it is lowered. Once the motor reaches its lowest position, (mechanical and electrical connections are made), the handle 1209 of the motor housing may be rotated from an unlocked position as shown in FIG. 13, to a locked position (see FIG. 3A), thereby engaging a camming surface associated with the handle 1209 with the stub pin (not shown), effectively locking the motor in place relative to the motor receptacle.

Again, while illustrated in the context of the motor, the battery (e.g., battery 1204 of FIG. 3B) may include a latching handle 1215 that operates in substantially the same way as the locking handle 1209 of the motor 1202.

Exemplary embodiments of this disclosure may accordingly provide a power equipment system having a modular motor and battery, and a plurality of power equipment units that may each have a different working tool. Each of the power equipment units may include a body adapted to simultaneously receive both the motor and the battery to operate, and the motor and battery may both be individually moved from one power equipment unit to another as needed. In some embodiments, the power equipment unit may be able to accommodate more than one battery to provide appropriately longer run times and/or higher power output to the motor. Moreover, one or more of the power equipment units may be configured to provide identity information (e.g., an electrical signal) to the motor and/or the battery. With this information, the motor may set its output torque or speed to match a torque or speed range that was predetermined to be most useful to the working tool associated with the specific PEU.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A power equipment system, comprising:
   an electric motor comprising a motor housing, an output member, and a motor controller;
   a battery comprising a battery housing and a battery controller, the battery housing separate from the motor housing, the battery adapted to provide power to the motor;
   a first power equipment unit and a second power equipment unit each independently operable to simultaneously receive both the motor and the battery, the first and second power equipment units each comprising:
      a battery interconnect adapted to electrically couple with the battery;
      a working tool;
      a coupler adapted to mechanically interconnect the output member of the motor with a driven member associated with the working tool; and
      a motor interconnect adapted to electrically couple with the motor;
   wherein the first power equipment unit further comprises a first tool controller adapted to provide an electrical identity information signal regarding the first power equipment unit to one or both of the motor controller and the battery controller when the motor and the battery are selectively coupled to the first power equipment unit.

2. The system of claim 1, wherein the identity information signal specifies an output speed to be provided by the electric motor.

3. The system of claim 1, wherein the identity information signal specifies an output power to be provided by the electric motor.

4. The system of claim 1, wherein the second power equipment unit further comprises a second tool controller adapted to provide a second identity information signal regarding the second power equipment unit to one or both of the motor controller and the battery controller when the motor and the battery are selectively coupled to the second power equipment unit, wherein the second identity information signal is different than the identity information signal provided by the first tool controller.

5. The system according of claim 1, wherein at least one of the first and second power equipment units, the battery, and the motor is adapted to: detect when the motor reaches an overload threshold; and reduce an output speed or power of the motor upon reaching the overload threshold.

6. A power equipment system, comprising:
- a motor comprising a motor housing and a motor controller;
- a battery comprising a battery housing and a battery controller;
- first and second power equipment units each independently adapted to simultaneously receive the motor and the battery, wherein each of the first and second power equipment units comprises:
  - a body defining a motor receptacle sized to receive the motor housing, and a separate battery receptacle sized to receive the battery housing;
  - a battery interconnect in or near the battery receptacle to electrically couple with a connector on the battery housing;
  - a working tool;
  - a motor coupler in or near the motor receptacle to mechanically couple an output member of the motor with a driven member coupled to the working tool;
  - a motor interconnect in or near the motor receptacle to electrically couple with a connector on the motor housing; and
  - a tool controller to generate an electrical identity information signal to one or both of the motor controller and the battery controller,
- wherein the tool controller of the first power equipment unit generates the identity information signal regarding the first power equipment unit when the motor housing and the battery housing are received within the motor receptacle and the battery receptacle, respectively, of the first power equipment unit, and
- wherein the tool controller of the second power equipment unit generates the identity information signal regarding the second power equipment unit when the motor housing and the battery housing are received within the motor receptacle and the battery receptacle, respectively, of the second power equipment unit.

7. A method of operating a plurality of power equipment units, the method comprising:
- attaching a battery comprising a battery housing at a first location on a first power equipment unit selected from at least two different power equipment units;
- attaching an electric motor comprising a motor housing and a motor controller at a second location on the first power equipment unit;
- transmitting, from a tool controller of the first power equipment unit, an identity information signal corresponding to the first power equipment unit;
- receiving, with the motor controller, the identity information signal; and
- operating a first working tool associated with the first power equipment unit, the first working tool operating under power provided by the electric motor and battery.

8. The method of claim 7, further comprising attaching a second battery comprising a second battery housing to the first power equipment unit while the battery is attached to the first power equipment unit.

9. The method of claim 7, comprising:
- removing the battery and the motor from the first power equipment unit; and
- attaching the battery and the motor to a second power equipment unit.

10. The method of claim 7, further comprising:
- automatically selecting, with the motor controller, a first output parameter of the motor based upon the identity information signal received by the motor controller.

11. The method of claim 7, further comprising:
- detecting when the motor exceeds an overload threshold; and
- reducing a speed or power of the motor automatically in response to exceeding the overload threshold.

12. The method of claim 11, wherein the overload threshold is specified within the identity information signal.

* * * * *